(12) United States Patent
Zeira et al.

(10) Patent No.: US 7,738,508 B2
(45) Date of Patent: Jun. 15, 2010

(54) PACKET SWITCHED CONNECTIONS USING DEDICATED CHANNELS

(75) Inventors: Eldad Zeira, Huntington, NY (US); Guodong Zhang, Farmingdale, NY (US); Stephen E. Terry, Northport, NY (US); Ana Lucia Iacono, Phoenixville, PA (US); Janet A. Stern-Berkowitz, Little Neck, NY (US); Maged M. Zaki, San Diego, CA (US); Teresa J. Hunkeler, Montreal (CA)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

(21) Appl. No.: 12/167,502

(22) Filed: Jul. 3, 2008

(65) Prior Publication Data

US 2008/0267123 A1 Oct. 30, 2008

Related U.S. Application Data

(63) Continuation of application No. 10/447,871, filed on May 29, 2003, now Pat. No. 7,397,790.

(60) Provisional application No. 60/446,956, filed on Feb. 12, 2003, provisional application No. 60/384,190, filed on May 29, 2002.

(51) Int. Cl.
    *H04J 3/12* (2006.01)
(52) U.S. Cl. .................. 370/524; 370/264; 370/329; 370/352

(58) Field of Classification Search .......... 370/328, 370/329, 229, 431, 437, 252, 352, 247, 251, 370/524, 264; 375/225
See application file for complete search history.

(56) References Cited

U.S. PATENT DOCUMENTS

| 5,790,551 | A | 8/1998 | Chan |
| 6,347,091 | B1 * | 2/2002 | Wallentin et al. ........... 370/437 |
| 6,407,983 | B1 | 6/2002 | Zheng et al. |
| 6,473,399 | B1 | 10/2002 | Johansson et al. |
| 6,760,303 | B1 * | 7/2004 | Brouwer ..................... 370/229 |
| 2001/0021180 | A1 | 9/2001 | Lee et al. |

(Continued)

FOREIGN PATENT DOCUMENTS

EP 1 107 633 6/2001

(Continued)

*Primary Examiner*—CongVan Tran
(74) *Attorney, Agent, or Firm*—Volpe & Koenig, P.C.

(57) ABSTRACT

A temporary (temp) dedicated channel (DCH) is used to support communications. The temp-DCH channel is a channel that is assigned to a user having a set duration. After the duration expires, the channel is automatically released to the user. Embodiments of the invention relate to establishing the temp-DCH channel, determining the data rate and duration of the channel. Other embodiments relate to establishing back-to-back temp-DCH channels and the implementation details of these embodiments. Additionally, one embodiment relates to adding a start/stop function to the medium access controller which can be used in conjunction with temp-DCH as well as other applications.

10 Claims, 26 Drawing Sheets

U.S. PATENT DOCUMENTS

| | | |
|---|---|---|
| 2001/0036829 A1 | 11/2001 | Costa et al. |
| 2001/0055275 A1 | 12/2001 | Herrmann et al. |
| 2002/0086685 A1 | 7/2002 | Wallentin et al. |
| 2002/0150066 A1 | 10/2002 | Schilling |
| 2002/0163886 A1 | 11/2002 | Zheng et al. |
| 2002/0172192 A1 | 11/2002 | Hunzinger et al. |
| 2002/0181436 A1 | 12/2002 | Mueckenheim et al. |
| 2003/0103476 A1* | 6/2003 | Choi et al. ............ 370/329 |
| 2003/0218997 A1 | 11/2003 | Lohtia et al. |

FOREIGN PATENT DOCUMENTS

| | | |
|---|---|---|
| EP | 1 154 667 | 11/2001 |
| WO | 01/76282 | 10/2001 |
| WO | 01/89235 | 11/2001 |

\* cited by examiner

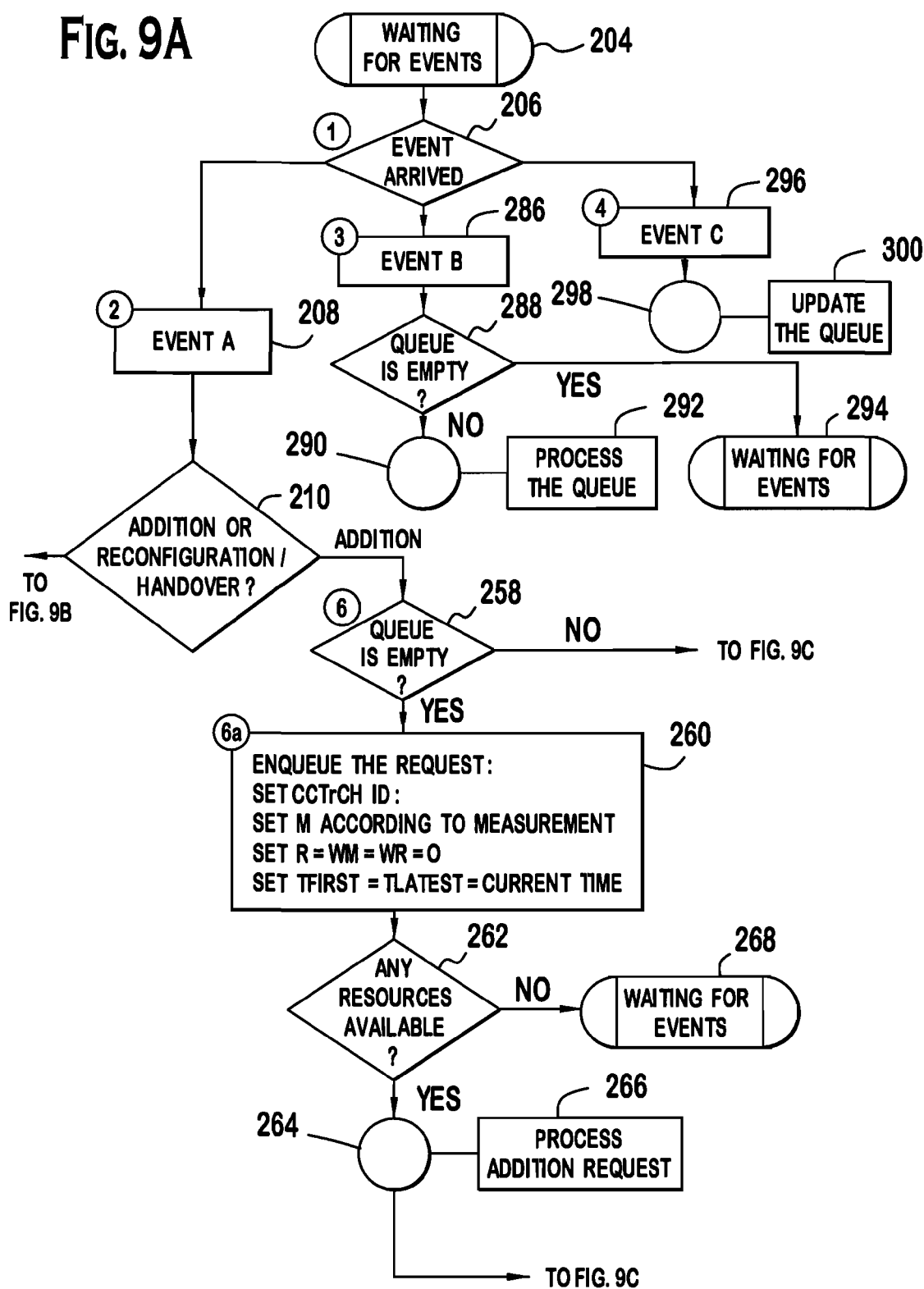

PACKET SWITCHED CONNECTIONS USING DEDICATED CHANNELS

CROSS REFERENCE TO RELATED APPLICATION(S)

This application claims priority from U.S. patent application Ser. No. 10/447,871, filed May 29, 2003, which claims priority from U.S. Provisional Application No. 60/384,190, filed May 29, 2002 and U.S. Provisional Application No. 60/446,956, filed Feb. 12, 2003, which are incorporated by reference as if fully set forth.

FIELD OF INVENTION

This invention generally relates to wireless communication systems. In particular, the invention relates to supporting packet switched connections in such systems.

BACKGROUND

In the past, wireless communication systems primarily provided voice based services. To support voice based services, the systems used circuit switched connections. As the demand for data based services increases, wireless systems have been evolving towards using packet switched connections. Some systems use a totally packet switched network infrastructure. Although the air interfaces in most systems have some channels dedicated for supporting packet data, such as the common packet channel, typically, each user is typically assigned dedicated channels to support its communications. Other systems use fixed dedicated channels to support packet data.

Typically, to establish dedicated channels, a user requests a service, such as by sending a message over a random access channel. After the user requests the service, typically, dedicated uplink and downlink channels are established to support the services. After the service is completed, the channels are disestablished. Due to the bursty nature of packet based transmissions, the allocation of fixed dedicated channels to packet based services is an inefficient use of resources. The established dedicated channels are left idle prior to, after and between bursts.

Accordingly, it is desirable to have alternate approaches to supporting packet based services that allow rapid establishment and disestablishment of dedicated channels.

SUMMARY

A temporary (temp) dedicated channel (DCH) is used to support communications. The temp-DCH channel is a channel that is assigned to a user having a set duration. After the duration expires, the channel is automatically released by both the user and network. Embodiments of the invention relate to establishing the temp-DCH channel, determining the data rate and duration of the channel. Other embodiments relate to establishing back-to-back temp-DCH channels and the implementation details of these embodiments. Additionally, one embodiment relates to adding a start/stop function to the medium access controller which can be used in conjunction with temp-DCH as well as other applications.

BRIEF DESCRIPTION OF THE DRAWING(S)

DETAILED DESCRIPTION OF THE PREFERRED EMBODIMENT(S)

Although the preferred embodiments are described in conjunction with a third generation partnership program (3GPP) wideband code division multiple access (W-CDMA) system utilizing the time division duplex (TDD) mode, the embodiments are applicable to any code division multiple access communication system, such as time division synchronous CDMA (TD-SCDMA), CDMA 2000, frequency division duplex (FDD) mode of W-CDMA among others.

Hereafter, a wireless transmit/receive unit (WTRU) includes but is not limited to a user equipment, mobile station, fixed or mobile subscriber unit, pager, or any other type of device capable of operating in a wireless environment.

Figure 1:
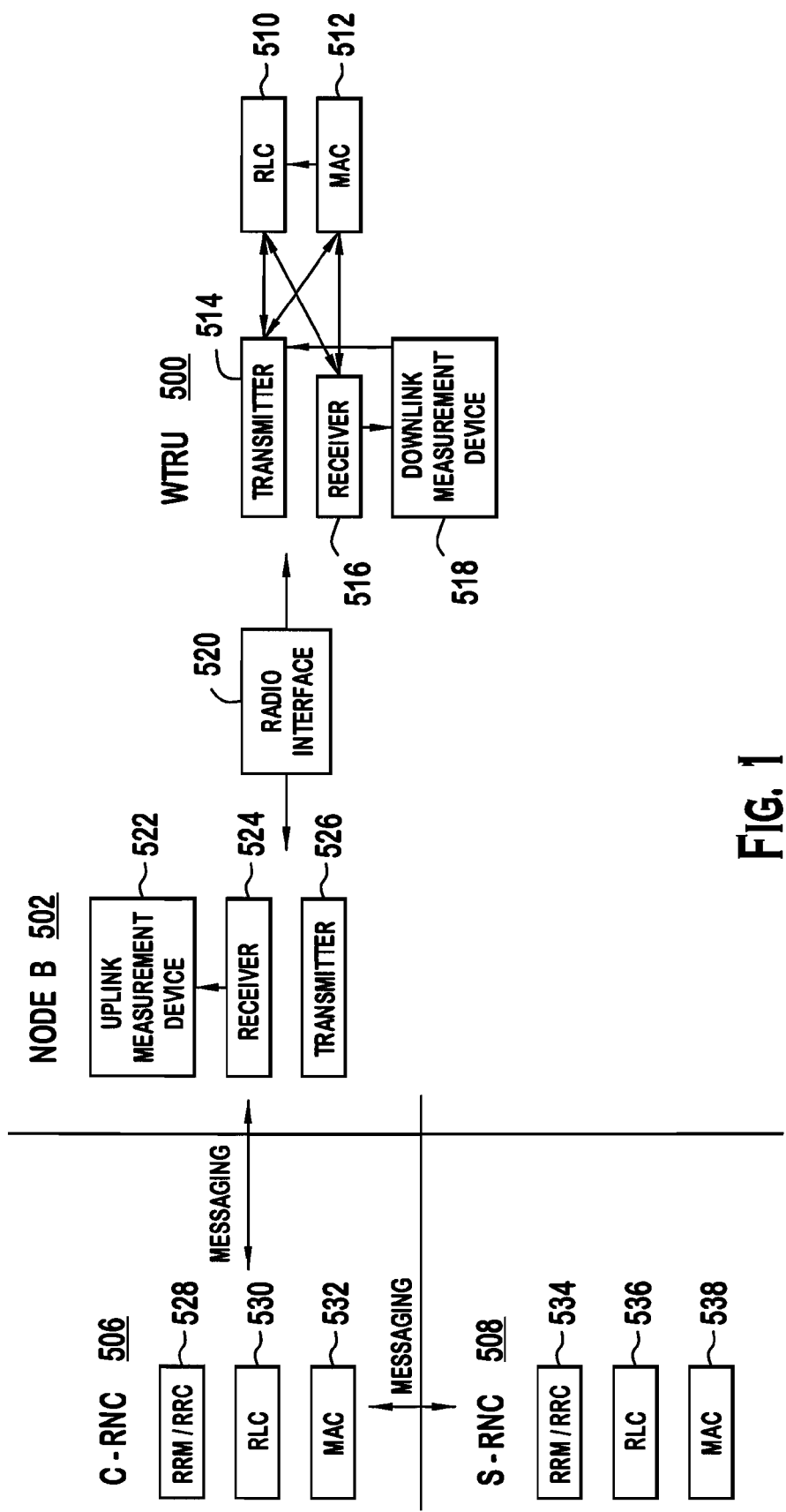
FIG. 1 is a simplified drawing of a wireless transmit/receive unit (WTRU), Node-B, cell radio network controller (C-RNC) and servicing radio network controller (S-RNC) for performing temp DCH.

FIG. 1 is a simplified diagram of a WTRU 500, Node-B 502, cell radio network controller (C-RNC) 506 and servicing radio network controller (S-RNC) 508 for performing temp-DCH. The WTRU 500 has a transmitter 514 and a receiver 516 for sending and receiving transmissions over the radio interface 520. A downlink measurement device 518 takes quality measurements of the downlink channels. The WTRU 500 also has a radio link controller (RLC) 510 and a medium access controller (MAC) 512.

The Node-B 502 has a transmitter 526 and a receiver 524 for transmitting and receiving transmissions over the radio interface 520. The Node-B 502 has an uplink measurement device 522 for taking uplink quality measurements. The Node-B 502 communicates to its C-RNC 506 using messages.

The C-RNC 506 has a radio resource management (RRM)/radio resource controller (RRC) 528, a RLC 530 and a MAC 532. The S-RNC 508 has a RRM/RRC 534, RLC 536 and MAC 538. The C-RNC 506 and S-RNC 508 communication with each other using messages.

In cellular systems, WTRU connections can be maintained on either dedicated channels (DCHs) or common channels, such as the uplink (UL) random access channel (RACH) and downlink (DL) forward access channel (FACH). Dedicated channels provide required quality of service while maintaining efficient use of radio resources with mechanisms, such as fast inner loop power control and transmit diversity. Common channels offer a "best effort" service that use a statically configured set of physical resources in the cell. It is desirable to maintain the WTRU connection on common channels whenever possible, since WTRU power and processing requirements are greatly reduced. Since dedicated resources are not assigned, possibly more WTRUs can be supported per cell.

When non-real time (NRT) applications are supported by the WTRU, frequent periods of no transmission or reception activity exist. For example for Internet web browsing, the user downloads a web page and then takes time to read the information. Due to the high rates of data transfer, the period required for the file download to the WTRU is a small fraction of the reading time. During this reading (low activity period), the DCH cell resources are not well utilized.

To better utilize radio resources, instead of a traditional allocation of a DCH to a WTRU, a temporary (temp) allocation of the DCH is made. The temp allocation is an assignment of a DCH with a predetermined duration. After that duration, the DCH is automatically released and the connection is returned to common channels. Limited dedicated resources within the cell are only allocated for the transfer of information. When the WTRU returns the connection to common channels, the WTRU power/processing requirements are reduced and dedicated cell resources are freed. The temp-DCH allows for more active NRT users to be supported within the cell and longer operation of the WTRU between charges. Additionally, rather than allocating low rate DCHs over long time periods, temp-DCH allows for a very high rate DCH allocations for short time periods, which tends to improve quality of service (QOS). The following are preferred embodiments for implementing temp-DCH.

In the preferred embodiment, the radio resources are handled using a distributed management scheme. Generally, call related aspects are handled by the S-RNC 508 and cell related aspects are handled by the C-RNC 506. Management of starting and controlling the packet switched connection is handled between the S-RNC 508 and C-RNC 506.

Figure 2:
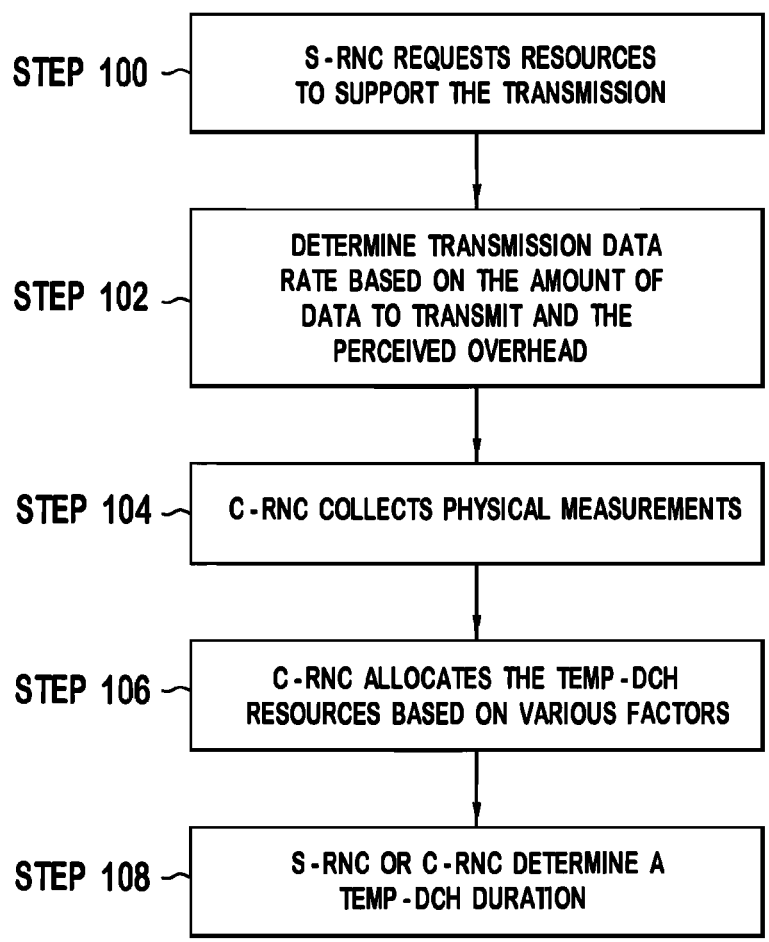
FIG. 2 is a flow chart of an embodiment of temp-DCH.

FIG. 2 is a flow chart of the general procedure for a temp-DCH allocation. After sufficient data has been collected for either an uplink or downlink transmission, the S-RNC 508 requests the resources to support the transmission, 100. The requested data rate for the transmission is based on the amount of data to transmit and the perceived overhead, 102.

One approach to determine the data rate is as follows. The highest data rate for the temp-DCH is based on the amount of data to be transmitted and the WTRU capabilities. To maintain the percentage of overhead close to a constant value, the highest data rate is maintained at a value roughly proportional to the amount of data. This constant overhead percentage allows for a certain resource efficiency to be guaranteed in the resource allocation. The overhead is preferably defined as the time in which resources are allocated but no data can be sent. This approach optimizes the system throughput in the presence of such overhead. The highest data rate requested by the S-RNC 508 is limited to requesting a data rate at or below the highest data rate supported by the WTRU.

The duration of the data transmission is preferably based on the allocated rate, R, and the amount of data to transmit, L. The highest data rate to request meets the following inequality.

$$\frac{\text{Duration }(R, L)}{\text{Duration }(R, L) + \text{Overhead}} \geq \Theta$$

$\Theta$ is the guaranteed resource allocation efficiency which is based on the constant value for the percentage of overhead. Duration (R,L) is the duration of the data transmission based on the allocated rate, R, and the amount of data to transmit, L.

One approach to determine the data rates is as follows, although others may be used. The highest rate to request for each transport channel can be determined as follows. BO is the buffer occupancy of DTCH reported, $T_{max}$ is the maximum Temp-DCH duration and $T_{min}$ the minimum Temp-DCH duration. The data rate, Rn, is calculated as follows.

$$R_n = \frac{BO}{\alpha T_{min} + (1-\alpha)T_{max}}$$

where $0 \leq \alpha \leq 1$.

$\alpha$ is a design parameter configured by the network operator.

$R_n$ represents the data rate required in order to empty the buffer during time $\alpha T_{min}+(1-\alpha)T_{max}$, which is a linear combination of the maximum and minimum Temp-DCH duration.

For $\alpha=1$ or $\alpha=0$, then $R_n$ represents the data rate needed to empty the buffer as follows.

$$R_n = \frac{BO}{T_{min}}, \text{ where } \alpha = 1$$

$$R_n = \frac{BO}{T_{max}}, \text{ where } \alpha = 0$$

A multiplicative $M_{Rn}$ is added such that the data rate exceeds $R_n \cdot M_{Rn}$. The margin is configured by the network operator.

The margin is used to compensate for errors in the transmission (causing retransmissions) and for new packets that may arrive in the buffer. To maximize the data rate and minimize the duration, $\alpha$ is set at $\alpha=1$. To minimize the data rate and maximize the duration, $\alpha$ is set at $\alpha=0$. Any other linear combination of Tmax and Tmin can also be used.

When performing resource allocation, the radio resource management (RRM) algorithm will take into account the range of rates requested, and try to allocate the maximum bandwidth possible for that service. The RRM tries to allocate the highest rate requested but, if that is not possible, RRM can decrease the rate until the minimum acceptable rate.

The minimum acceptable rate does not have to be necessarily the minimum TFC in the TFC subset described previously. The TFC subset defines all possible data rates that can be used by the WTRU at any given time. That includes the case where there is no traffic, and only control information is being exchanged. The data rate necessary to send control information is very small. If RRM only allocates such small bandwidth to the service, only control information can be sent. This is because, in general, non-real time (NRT) services are configured to use AM-RLC. In this mode of operation the transport block size is fixed. Since there is a maximum number of transport blocks that can be supported by the WTRU at any given time, in order to support high data rates (e.g., 2 Mbps), the transport block size has to be large, and cannot be segmented. Such large transport block may not fit in the small bandwidth needed by the signaling channel.

In order to avoid this situation, a lowest acceptable bit rate can be defined, which can be greater than the minimum TFC in the TFC subset. This data rate could, for example, is represented by the TFC that has the minimum data rate greater than zero for DTCH. This rate would also allow for signaling information to be sent, since transport blocks for DCCH channels are usually small. Since the Temp-DCH allocation is efficient (rates and duration are determined as a function of traffic volume measurements), the bandwidth would be completely utilized most of the time.

Moreover, if the traffic volume measurements are zero in one direction only (uplink or downlink), one cannot assume that there will be no data in that direction. This is because TCP/IP protocol requires exchange of acknowledgements (ACK). TCP ACKs are also DTCH packets, and thus have to respect the transport block sizes of the DTCH.

In summary, it is important to define a guaranteed bit rate for temp-DCH allocations in both uplink and downlink directions. This guaranteed data rate should be sufficient to send at least one transport block of DTCH and DCCH information (not necessarily at the same time).

The C-RNC 506 makes the resource allocation. To make the resource allocation, the C-RNC 506 may need to collect physical measurements before the resources are allocated, 104. The uplink measurements are provided by the Node-B 502 and the downlink measurements are provided by the WTRU. The WTRU may send the uplink measurements on the random access channel (RACH) or the measurements may be sent on a low rate channel for a limited duration, such as if the system designer does not want to load the RACH or measurement information is not available on the RACH.

The C-RNC 506 bases its resource allocation and the quality of the allocated resources, such as the data rate, based on the following factors, 106: the requested data rate, the availability of resources, the number of requests already waiting for resources or the amount of data represented by such requests. The resources may also be allocated based on an estimation of the availability of such resources in the future. This estimated availability is based on the known duration of other transmissions. The minimum allocated data rate may be adjusted so that it can support the sending of layer-3 control messages. This minimum allocated rate tends to maximize the network robustness under high loading conditions.

Figure 3:
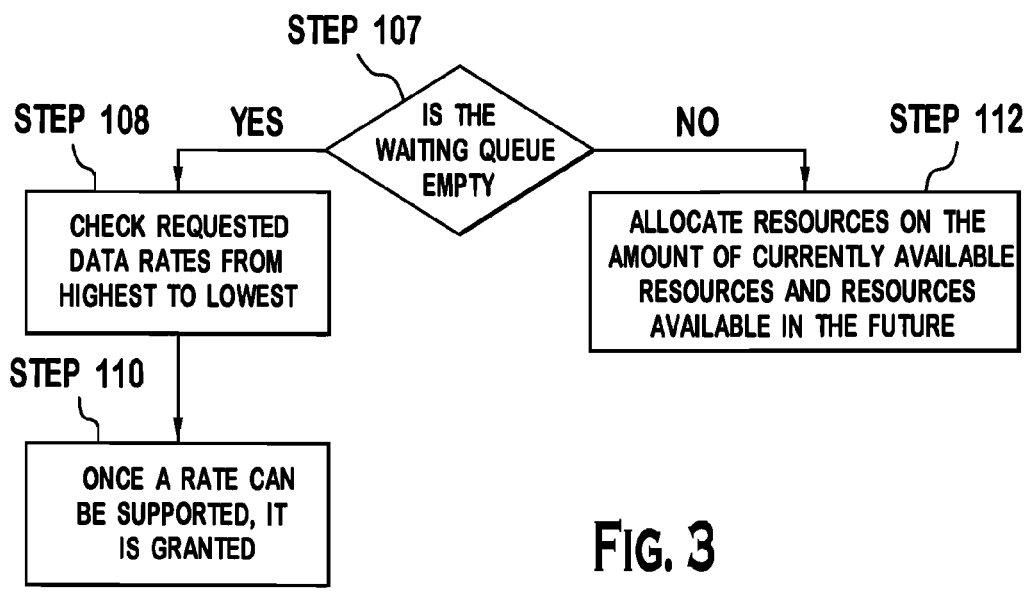
FIG. 3 is a flow chart of resource allocation for temp-DCH.

When the uplink and/or downlink measurements are available, one approach for determining the resource allocation is per the flow chart of FIG. 3. When the waiting queue is empty, 107, the C-RNC 506 checks the requested data rates of the WTRUs from the highest to the lowest requested data rate, 108. The C-RNC 506 checks each rate, in turn, to determine whether the current available resources can handle it. Once such a rate is found, it is granted, 110. The implementation of these procedures may be similar to those for call admission for real time services.

When the waiting queue is not empty, 107, the C-RNC 506 bases the allocated resources on the amount of currently available resources, the amount of resources predicted to be available in the near future and the number of requests in the queue, 112.

One approach to allocate the resources fairly allocates the currently available or soon to be available resources among all requests waiting in the queue. After being notified by the S-RNC 508 of the duration of previous allocations, the C-RNC 506 can determine the availability of resources in the near future, $RU_{total}$. $RU_{total}$ includes the amount of currently available resources and the resources that will be released by a certain time period. That time period is a design parameter.

The C-RNC 506 determines the average amount of resources, $RU_{ave}$, that could be allocated to each temp-DCH request based on the $RU_{total}$ limit, such as follows.

$$RU_{ave} = \frac{RU_{total}}{N_{request}}$$

$N_{request}$ is the number of temp-DCH requests.

The resources are allocated in order to attempt to meet the average, $RU_{ave}$, for each user.

Another approach to allocate the resources fairly allocates the resources but weighs the allocation based on the amount of resources requested per temp-DCH request. Each WTRU is provided resources in relation to the amount requested. One potential allocation of the resources to a WTRU i, $RU_{request}(i)$, is as follows.

$$RU(i) = \frac{RU_{request}(i)}{\sum_{n=1}^{N_{request}} RU_{request}(n)} RU_{total}$$

Another approach to allocate the resources fairly allocates the resources based on their order in the queue. The C-RNC 506 processes individual requests according to their order. It treats each request as if there are no other requests in the queue. Before the C-RNC 506 processes the request, the measurement timer is checked. If the measurements are old, the C-RNC 506 ignores the measurements and allocates the resources as if measurements are not available.

If the measurements are current, the C-RNC 506 processes the first request followed by the next request in the queue and so on. The queue is effectively treated as a first in first out (FIFO) queue.

Figure 4:
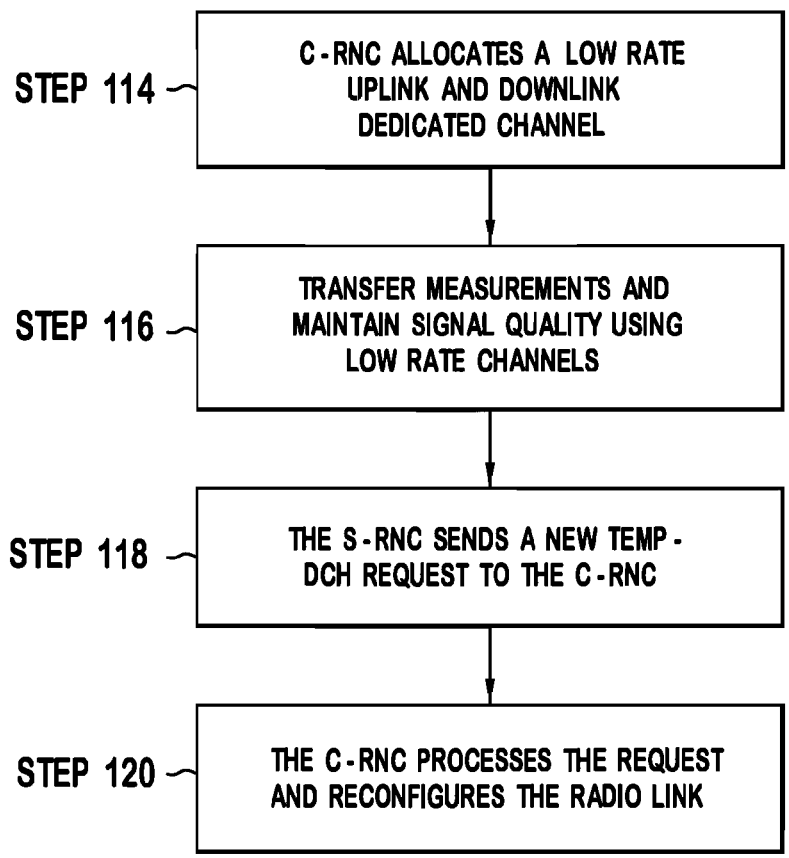
FIG. 4 is a flow chart for temp-DCH when uplink measurements are not available.

When the uplink measurements are not available, a temp-DCH allocation can be made without the measurements. One preferred approach allocates a low rate temp-DCH to allow for the measurements to be gathered, as per the flow chart of FIG. 4. When the uplink measurements are not available, the C-RNC 506 preferably allocates a low rate uplink and downlink dedicated channel with limited or unlimited duration. Both the uplink and downlink channels are used to transfer the measurements and maintain signal quality, 116. Since the uplink channel quality is not known, the C-RNC 506 makes the resource allocation using common measurements, such as uplink timeslot interference signal code power (ISCP) and Node-B carrier power, and the requested signal to interference ratio (SIR) or SIR range.

The data rate for the low rate channel, $R_{sr}$, is a design parameter. One potential allocation for the low rate channel is one resource unit, although others can be used. The duration of the low rate channel, $T_{sr}$, is preferably a fixed value, which is a design parameter. The minimum duration is long enough to obtain the uplink measurements. The duration should be sufficient to allow the S-RNC 508 to send a new temp-DCH request to both the C-RNC 506, 118 and the WTRU 500. Such a request is preferably a reconfiguration request. That reconfiguration request includes the information of uplink measurements, such as the physical common packet channel (PC-CPCH) received signal code power (RSCP) and timeslot ISCP. The duration should also be sufficient to allow the C-RNC 506 to process the request and reconfigure the radio link before the end of the first transmission, if the available resources permit the reconfiguration, 120.

Preferably, the C-RNC 506 determines whether the low rate temp-DCH can be supported in the uplink prior to the downlink, although the downlink can be determined first. One approach to determine whether the low rate temp-DCH can be supported is as follows, although others can be used. For the C-RNC 506 to determine whether the low rate uplink temp-DCH channel can be supported, the WTRU transmit power, TransmitPower, is estimated such as follows.

TransmitPower=ISCP+Pathloss$_{95\%}$+SIR$_T$+NoiseRise+Margin

Pathloss$_{95\%}$ is the maximum pathloss for the $95^{th}$ percentile of the distribution of WTRUs' pathlosses in the cell. This value is typically computed beforehand and is stored in the C-RNC 506. NoiseRise is the noise rise estimate which could be obtained, for example, from simulations using the pathloss value of Pathloss$_{95\%}$. SIR$_T$ is the target SIR. Margin is a design parameter.

If estimated WTRU transmit power is larger than the WTRU maximum transmit power, the uplink low rate temp-DCH channel is not allocated for the uplink.

In the preferred embodiment, if the low rate temp-DCH can not be allocated in the uplink, the C-RNC 506 will not consider a downlink allocation. If the uplink is allocated, the WTRU transmit power is estimated using the Node-B transmit carrier power, such as follows.

TransmitPower=(ISCP+Pathloss$_{95\%}$)+SIR$_T$+Margin

The Pathloss and ISCP are correlated. The WTRU transmit power follows a statistical distribution. The 95 percentile of WTRU downlink transmit power given an average Node-B transmit carrier power in neighboring cells, TXPower$_{95\%}$, is preferably calculated and stored in the C-RNC 506. The maximum allowed transmit power for the WTRU 500 in a timeslot, TXCARRIER$_{allowed}$, is based on the serving cell transmit carrier power in a timeslot, TXCARRIER$_{serving}$, and the maximum transmit carrier power, such as follows.

TXCARRIER$_{allowed}$=TXCARRIER$_{max}$−TXCARRIER$_{serving}$

If TXPower$_{95\%}$ is less than TXCARRIER$_{allowed}$, the downlink low rate temp-DCH channel is allocated.

If resources can not be allocated to transfer the data, the request is queued until it can be transmitted. If a maximum queuing time is reached prior to sufficient resources being allocated, the request is not transmitted. If multiple queues are used, the queues may be partitioned based on priority or other criteria.

After resources are granted, the S-RNC 508 computes a duration (transmission time period) based on the time required to transmit available data and/or data predicted to arrive, 108. If the duration is computed, this information may be transmitted to the WTRU 500. Prior to the termination of the temp-DCH transmission, the amount of data not transmitted may be evaluated and the S-RNC 508 may request additional resources to transmit the data. If the resources are granted prior to expiration of the original duration, the duration may be extended, creating a continuous activation. The continuous activation typically improves power control performance.

If the duration information is not transmitted to the WTRU 500, the S-RNC 508 sends a termination message to both the WTRU 500 and C-RNC 506. The sending of the termination message is based on the prediction of the time to transmit all of the buffered data, which tends to reduce the overhead. In some implementations, the C-RNC 506 may be capable to terminate a previously granted connection, such as if the queued requests have higher priority.

The C-RNC 506 or S-RNC 508 may determine the duration of the temp-DCH transmissions. The preferred duration calculation is based on the amount of buffered data for each WTRU 500 and the associated priorities. For a UMTS system, this information is reported by traffic volume measurements. The duration is also based on the allowed transport format set (TFS) and transport format combination sets (TFCS). To facilitate the duration combination, the C-RNC 506 or S-RNC 508 may imitate the MAC-d behavior by running a selection with the current data amounts, associated priorities and allowed TFS/TFCS subsets as MAC-d inputs. In this way, the C-RNC 506 or S-RNC 508 can calculate the time that MAC-d will need to transmit the current buffered data and set the duration accordingly.

Alternately, the duration of the temp-DCH, T$_{duration}$, can be determined as follows. BO is the buffer occupancy and R$_{max}$ be the maximum data rate accepted by the C-RNC 506 to the temp-DCH (the maximum data rate accepted could be less than the maximum data rate requested/desired). The duration is calculated as required to empty the buffer if the maximum data rate is used, as follows.

$$T_{tx} = \frac{BO}{R_{max}} M_{tx}$$

where Mtx is a margin configured by the network operator.

The margin is used to increase the duration in order to allow for time to send any acknowledgements required at the end of the call/session. The calculated duration of the temp-DCH has to be multiple of the longest TTI length in the TFCS of the CCTrCH, T$_{longest}$. Therefore, the calculated duration, T$_{duration}$, is computed as follows.

$$T_{duration} = \left\lceil \frac{T_{tx}}{TTI_{longest}} \right\rceil TTI_{longest}$$

Alternately, the radio network controller determines if the back-to-back allocation is needed for new data or for new transmissions. If for new data, the request is entered into the queue and treated like any other request. For retransmissions, the allocation is extended for the duration necessary for the retransmission. The retransmissions may occur at a lower data rate.

A maximum and minimum duration can be defined. In that case the allocated duration for Temp-DCH should not exceed the maximum duration T$_{max}$ and cannot be less than the minimum duration, T$_{min}$. Therefore, If the calculated duration T$_{duration}$ is no greater than T$_{max}$, then the allocated duration will take the value of calculated duration. Otherwise, the allocated duration will take the value of maximum duration T$_{max}$.

If the calculated duration $T_{duration}$ is no less than $T_{min}$, then the allocated duration takes the value of calculated duration. Otherwise, the allocated duration will take the value of minimum duration $T_{min}$.

If after the allotted duration there is still enough data to transmit, the S-RNC 508 will request a back-to-back allocation. In the back-to-back allocation, a second temp-DCH transmission is made directly after the initial transmission. The second transmission may be at the same data rate or at a different data rate than the initial transmission. If data is still present after the second transmission, subsequent back-to-back allocations can be made.

Figure 5:
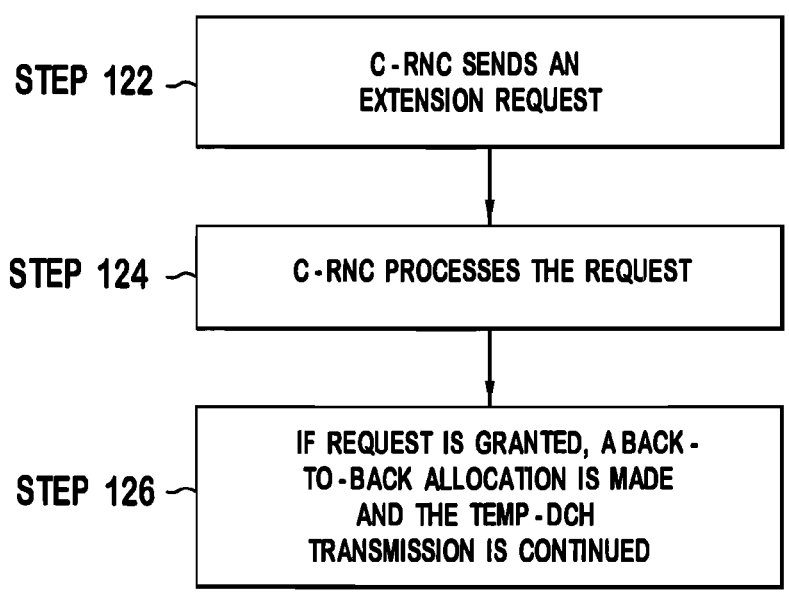
FIG. 5 is a flow chart for a back-to-back temp-DCH transmission.

For a back-to-back transmission as shown in the flow chart of FIG. 5, "near the end" of the prior duration, the C-RNC 506 sends an extension request, 122. The request needs to be made in sufficient time for the physical channel to be set up prior to the end of the current allocation duration. This time period needs to account for the signaling delay, assuming that the resources for the subsequent allocation are available.

Preferably, the request is sent to the C-RNC 506. The C-RNC 506 processes the request the same way as the initial request, 124. If the C-RNC 506 approves the request prior to the end of the current temp-DCH, the coded composite transport channel (CCTrCH) continues its transmission over the dedicated channel, 126. If the second allocation is not made in time, the C-RNC 506 releases the dedicated channel at the end of the duration.

Figure 6:
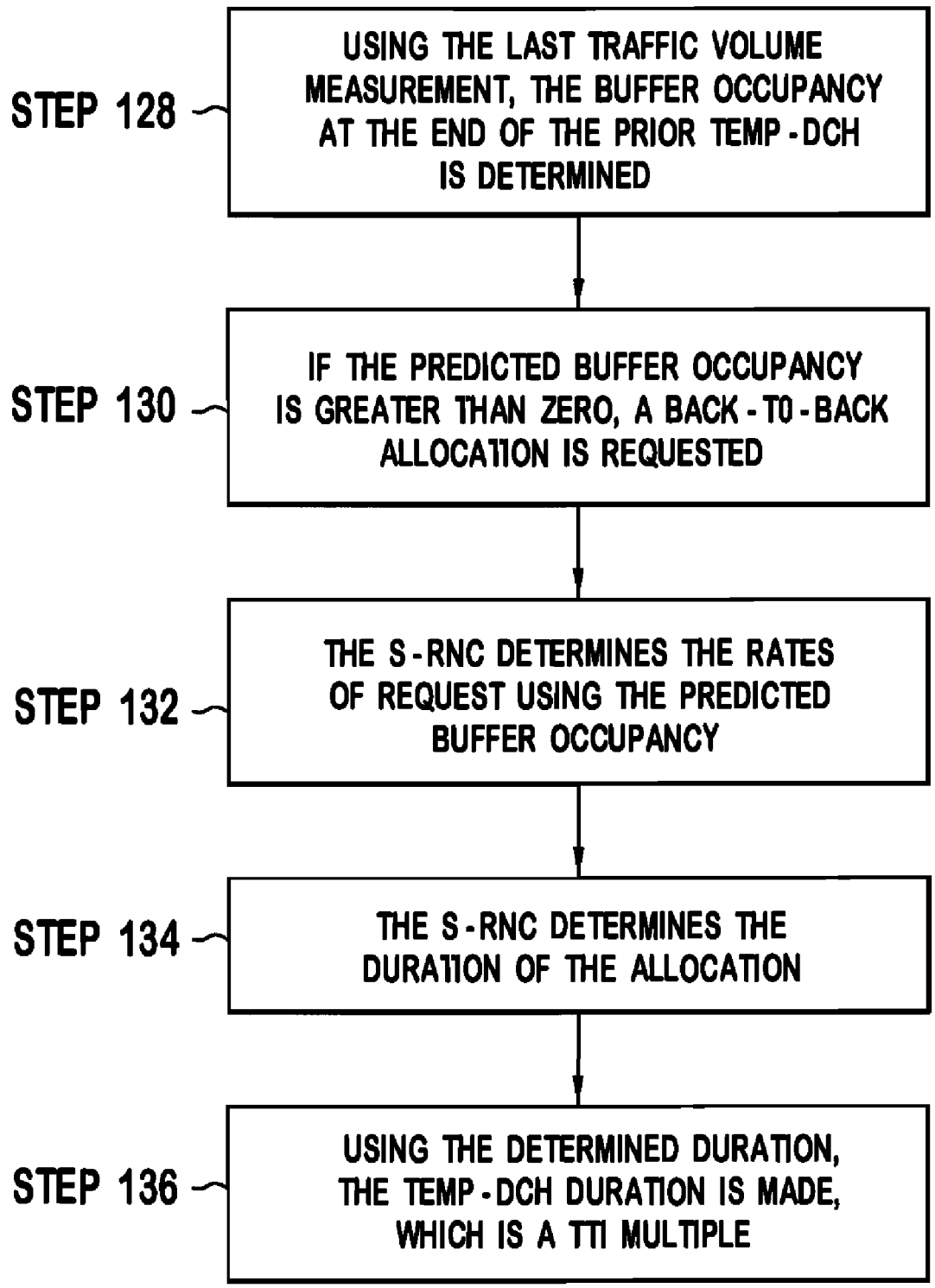
FIG. 6 is a flow chart for an alternate embodiment for a back-to-back temp-DCH transmission.

An alternate procedure for a back-to-back allocation is as follows and is shown in FIG. 6. Before the end of the temp-DCH duration, the S-RNC 508 decides if an extension of the duration will be required. The extension of the duration is a new allocation at the WTRU side: the duration of the previously allocated temp-DCH will expire, and a new temp-DCH will be configured.

The decision of whether or not to request a back-to-back allocation should be made based on the latest received Traffic Volume Measurements. TVM is the last traffic volume measurement (buffer occupancy reported), $R_{current}$ is the maximum data rate currently allocated to the Temp-DCH and $D_{left}$ is the duration left for the current Temp-DCH (from the time where the last TVM was received). The buffer occupancy, $BO_{end}$, at the end of the duration can be predicted to be as follows, 128.

$$BO_{end} = TVM - R_{current} \cdot D_{left}$$

The smallest possible traffic volume is at the end of the duration since it is assumed that the maximum data rate will be used and no new packets will arrive. Back-to-back is requested if $BO_{end}$ is greater than zero, 130.

If back-to-back allocations are to requested, the S-RNC 508 needs to determine the rates to request, 132. The highest rate to request can be calculated as follows.

$$R_n = \frac{BO_{end}}{\alpha T_{min} + (1-\alpha) T_{max}}$$

$TFC_m$ is the TFC that represents the highest rate to request, such that $$TFC_m > Rn \cdot M_{Rn} > TFC_{m-1}$$

where $M_{Rn}$ is the margin configured by the network operator.

If back-to-back allocations are requested, the S-RNC 508 needs to determine the duration of the allocation, 134. The duration can be calculated as follows.

$$T_{tx} = \frac{BO_{end}}{R_{max}} M_{tx}$$

where $R_{max}$ is the maximum data rate accepted by the C-RNC 506 for the back-to-back allocation, Mtx is a margin configured by the network operator.

Similarly, the calculated duration of the temp-DCH has to be multiple of the longest TTI length in the TFCS of the CCTrCH, $T_{longest}$. Therefore, the calculated duration, $T_{duration}$, is computed as follows, 136.

$$T_{duration} = \left\lceil \frac{T_{tx}}{TTI_{longest}} \right\rceil TTI_{longest}$$

Figure 7:
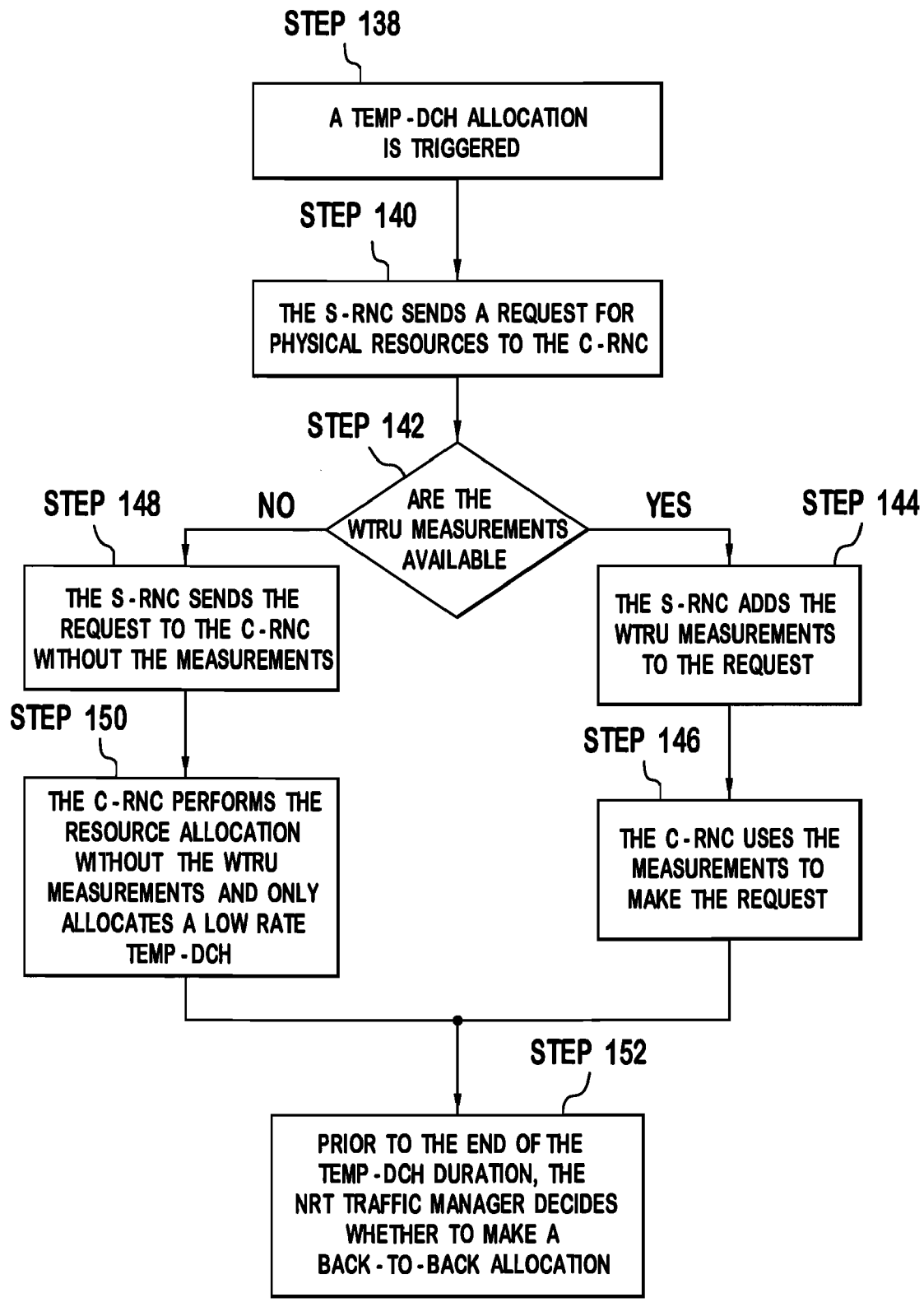
FIG. 7 is a flow chart for an embodiment of temp-DCH for an UTRA-TDD environment.

One preferred approach to temp-DCH implemented in a UTRA-TDD environment is as follows and is shown in FIG. 7. The temp-DCH allocation is based on whether the WTRU intra-frequency measurements are available in the C-RNC 506 and whether the allocation is back-to-back.

After the temp-DCH allocation is triggered, due to Traffic Volume Measurement (TVM) reporting from the WTRU 500 or S-RNC MAC, 138, the S-RNC 508 sends a request for physical resources to the C-RNC 506, with a "CCTrCH to add" message, 140. If WTRU measurements are available, 142, the S-RNC 508 adds the reported measurements to the request, 144. These measurements are used by the C-RNC 506 to perform resource allocation, 146. When the WTRU measurements are not available, 142, the S-RNC 508 sends the request to the C-RNC 506 without WTRU measurements, 148. The C-RNC 506 performs the resource allocation without WTRU measurements and, preferably, only a low-rate allocation is made, 150. Alternately, the C-RNC 506 can perform the resource allocation without the measurements without utilizing the low-rate allocation.

Once the resources are allocated, the S-RNC 508 continues monitoring the TVM. Prior to the end of the temp-DCH duration, the NRT traffic manager at the S-RNC 508 decides whether to request a back-to-back allocation, 152. In order to request a back-to-back allocation, the S-RNC 508 sends a request with a "CCTrCH to modify" message. Since the C-RNC 506 does not know the duration of the temp-DCH allocation, the allocation is treated as being permanent by the C-RNC 506. Accordingly, only a reconfiguration or a release triggers changes in the CCTrCH. For the WTRU 500, the back-to-back allocation is a new temp-DCH allocation with an activation time equal to the end of the duration of the previous temp-DCH. As a result, the WTRU 500 remains in a cell dedicated channel "CELL_DCH" state.

Back-to-back requests cannot be queued, since they must be served immediately in order to be able to be assigned to the WTRU 500 before the duration of the previously allocated temp-DCH expires (i.e., "back-to-back"). Requests for new resources are queued for a fixed period of time.

The signaling for the first temp-DCH allocation is different than the signaling for subsequent allocations. This difference results when there is no radio link established for that WTRU 500 in that cell. A Radio Link Setup procedure is used. If a radio link is already established, a Radio Link Reconfiguration procedure is used. The Temp-DCH allocation procedures are described as follows.

The non-real time (NRT)-TM in the S-RNC 508 is responsible for deciding when a Temp-DCH allocation procedure should be triggered. The decision is based on Traffic Volume Measurement reports from the UE and the MAC-d in the S-RNC 508.

The first Temp-DCH allocation is triggered via a Radio Link Setup procedure (i.e., the S-RNC 508 sends a "Radio Link Setup Request" message to the C-RNC 506). Subsequent allocations are done using a synchronized Radio Link Reconfiguration procedure (i.e., S-RNC 508 sends a "Radio Link Reconfiguration Prepare" message to the C-RNC 506).

It is desired that a temp-DCH allocation be a synchronized procedure. However, the first establishment of a temp-DCH is done using a Radio Link Setup procedure. This procedure is always unsynchronized in the UTRAN side (C-RNC 506 and Node-B 502); but the S-RNC 508 may still assign an activation time to the WTRU 500.

Preferably, the following rules are used. For the first allocation, the S-RNC 508 assigns an activation time to the WTRU 500 and coordinate the activation time with the MAC in the S-RNC 508. Note that, for the Node-B 502 and the C-RNC 506, the procedure is unsynchronized, and the new configuration takes effect immediately after the configuration (i.e., Node-B 502 starts sending special bursts in the downlink as soon as it receives the "Radio Link Setup Request"). All other allocations following the Radio Link Setup are done using synchronized procedure in both WTRU 500 and UTRAN sides.

Figure 8A:
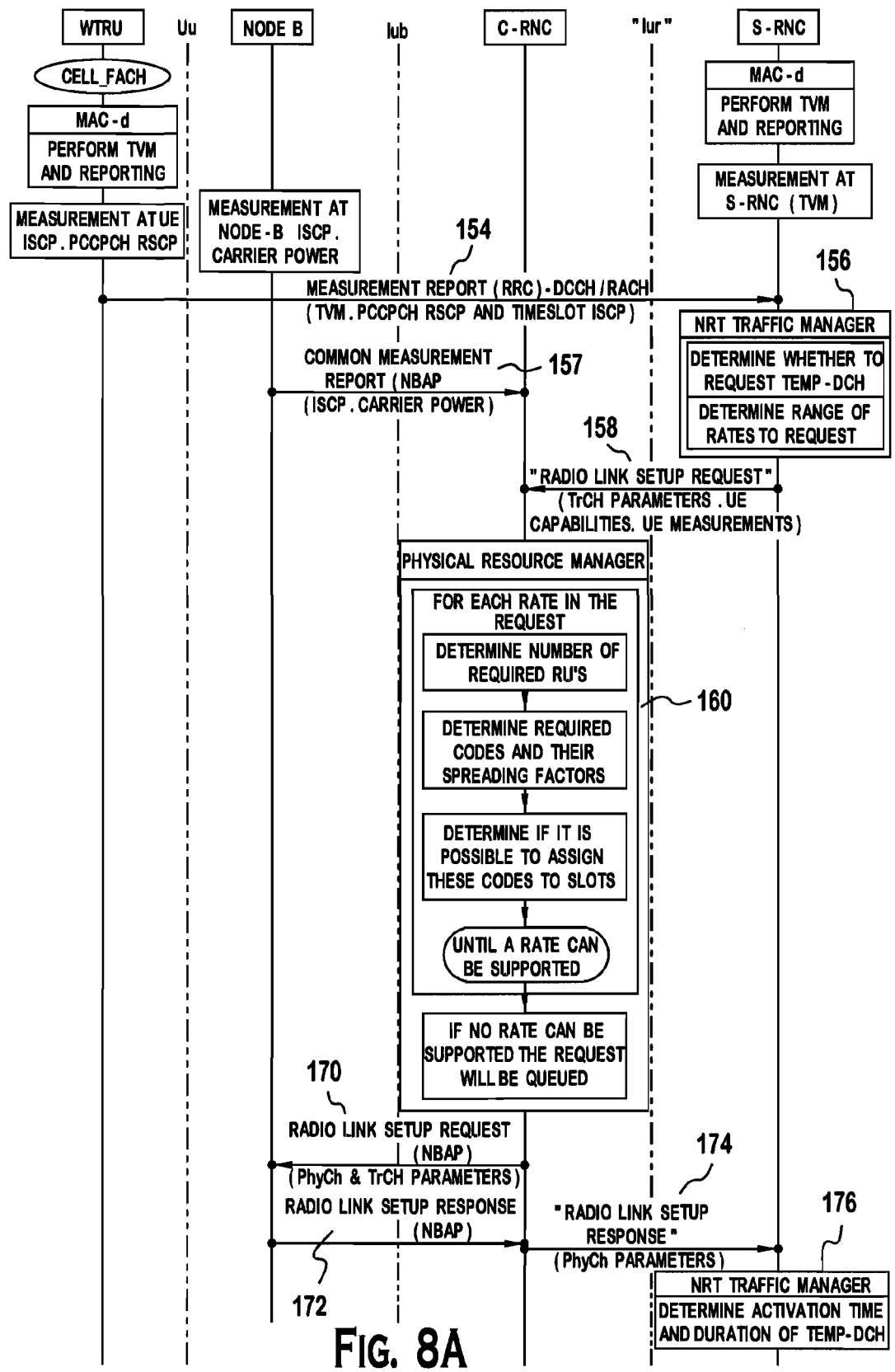
FIGS. 8 (8A and 8B) is a messaging diagram of a call admission control procedure that uses WTRU measurements.
Figure 8B:
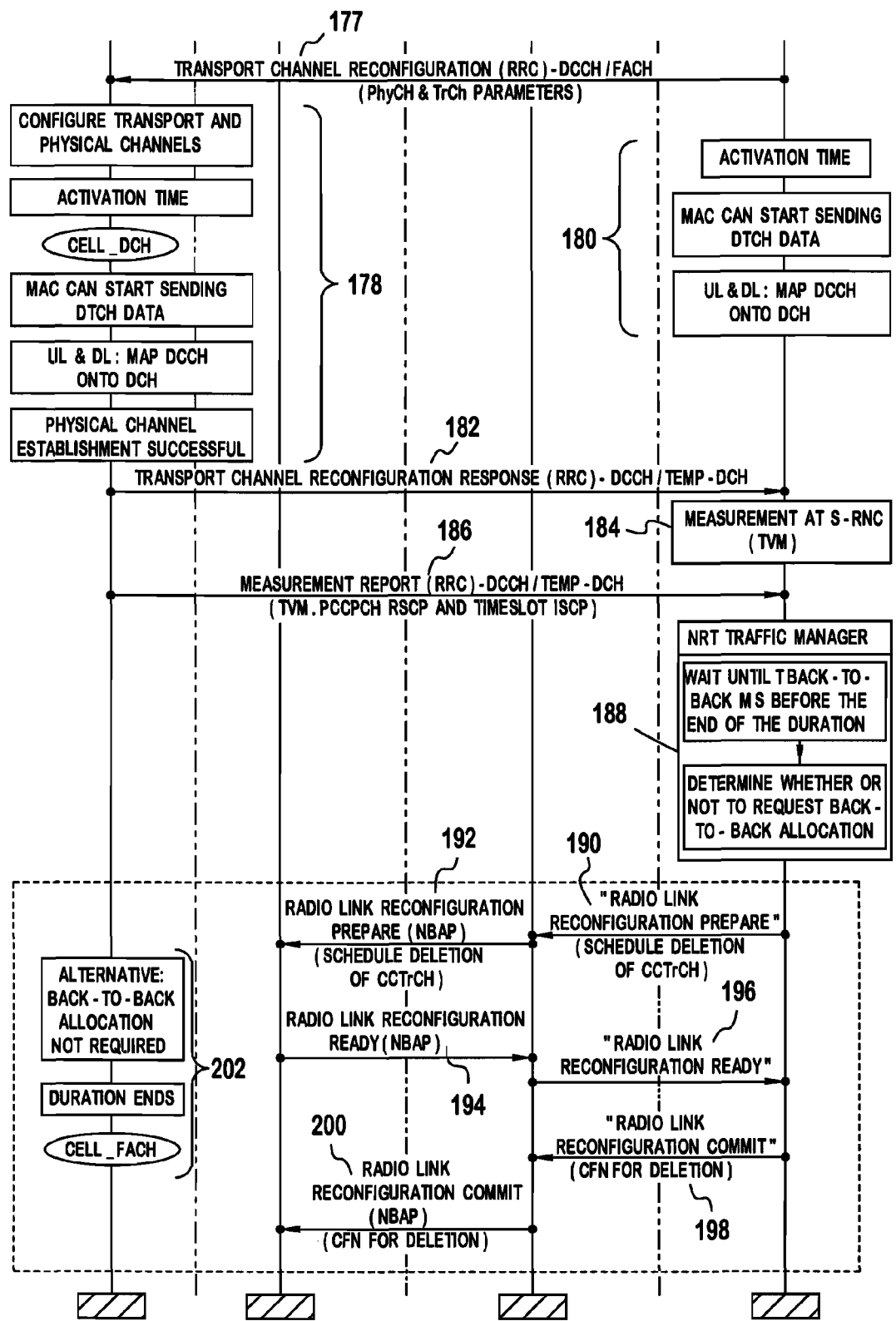

The Call Admission Control procedure uses WTRU measurements to allocated resources and is shown in FIG. 8. These measurements are sent from the WTRU 500 to the S-RNC 508, and the S-RNC 508 forwards them to the C-RNC 506. These measurements may not be available. This following relates to the case where WTRU measurements are available and sent to the C-RNC 506. However, this approach can be applied if the measurements are not available.

The signaling for the first temp-DCH allocation for NRT services when the uplink TVM triggers the temp-DCH allocation (WTRU measurements of downlink (DL) Timeslot ISCP and P-CCPCH RSCP are available at the S-RNC 508 and then forwarded to the C-RNC 506), 154. Common measurements, such as ISCP and carrier power, are sent from the Node-B 502 to the S-RNC 508, 157.

The activation of temp-DCH is based on threshold crossing of the traffic volume. Once the NRT-TM decides to allocate a Temp-DCH for a CCTrCH, it determines the highest (desired) and lowest (acceptable) rates to request for this CCTrCH, 156.

All the TFCs in the TFCS are ordered in order of increasing data rate: {TFC1, TFC2, . . . TFCn}. A TFCm is picked to be the TFC that represents the highest rate to request, such that the following inequality is correct.

$$TFC_m > Rn \cdot M_{Rn} > TFC_{m-1}$$

Where $M_{Rn}$ is the margin configured via overhead and maintenance (O&M).

The margin is used to compensate for errors in the transmission (causing retransmissions), for new packets that may arrive in the buffer and also for any control messages over dedicated control channels (DCCH) mapped to that CCTrCH. The minimum acceptable TFC is the minimum TFC defined by O&M. The minimum and maximum TFCs are preferable determined by the S-RNC 508.

Common measurements are sent from the Node-B 502 to the C-RNC 506, 160. The S-RNC 508 sends a "Radio Link Setup Request" message to the Physical Resource Manager in the C-RNC 506, 158. The message preferably contains the following information.

Allowed queuing time (input from O&M)
UE Capabilities (as obtained from the "UE Capability Information" message received in the S-RNC 508)
Maximum number of timeslots per frame
Minimum SF
Maximum number of physical channel per timeslot
Maximum number of physical channel per frame in the DL
CCTrCH information
CCTrCH ID
TFCS (represents the maximum desired and minimum allowed data rates)
TFCI coding
Puncturing Limit (PL)
Downlink power control information
TPC step size
TPC CCTrCH list
Transport channel information
TrCH ID
TFS
Target BLER for each transport channel
Transport channel source statistics descriptor (used to distinguish between RT and NRT) as shown in Table 1.
UE Measurements
P-CCPCH RSCP
Timeslot ISCP
Special burst scheduling period (for DL transmission of special bursts)

Table 1 is a preferred mapping of transport channel statistic descriptors into service type.

TABLE 1

| Service Type | Transport Channel Source Statistics Descriptor |
|---|---|
| NRT | Unknown |
| Control | RRC Signaling |

Figure 9B:
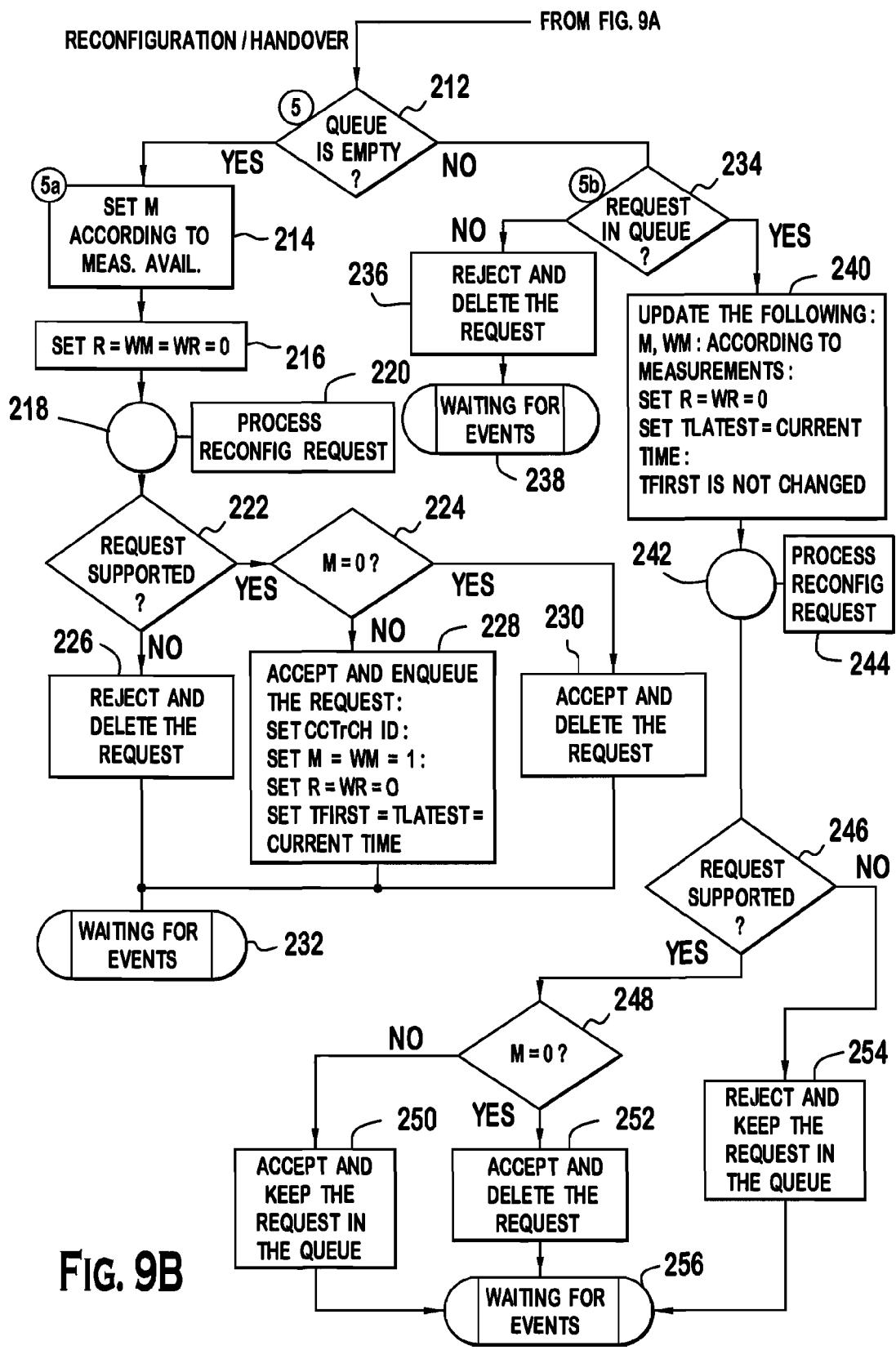
FIGS. 9 (9A, 9B and 9C) are a flow chart of processing non-real time (NRT) requests.
Figure 9C:
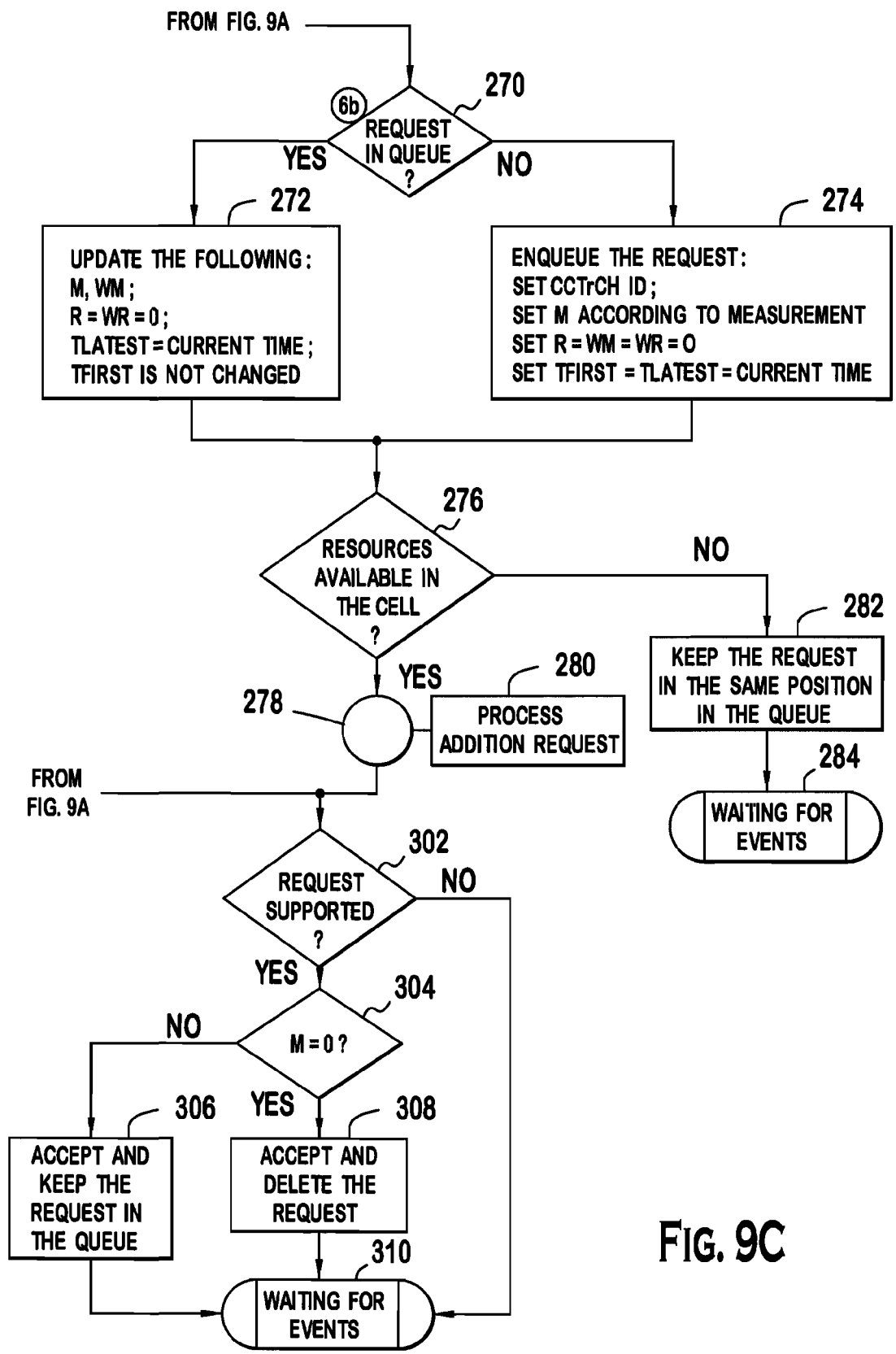

The physical resource managers processing of a request is described in conjunction with the flow chart of FIG. 9. For the physical resource manager to process a request, 160, the following timers are preferably used.

Time that the request can stay in the queue,
Time that the S-RNC 508 can wait for a response, The Physical Resource Manager will maintain a queue with the requests. One illustrative example of entries in each request is as follows, although others may be used:

CCTrCH ID
Flag M indicating "measurements not available or invalid" (measurement is invalid if the validity expired)
  M=1 if measurements are invalid
  M=0 if measurements are valid
Flag R indicating the "request validity expired"
  R=1 if request validity expired
  R=0 if request is valid
Flag WM indicating "waiting for measurements"
  WM=1 if request is waiting for measurements
  WM=0 if request has measurements available
Flag WR indicating "waiting for request update"
  WR=1 if request is waiting for an update
  WR=0 if request is not waiting for an update
Flag NB indicating "Node-B measurements were unavailable".
  NB=1 if request was rejected due to unavailability of Node-B measurements
  NB=0 if Node-B measurements unavailability did not cause request to be rejected Time-stamp of when the request for that CCTrCH arrived for the first time (Tfirst)

Time-stamp of when the latest request for that CCTrCH arrived (Tlatest)

The following events are defined.

Event A: a new request arrives, 208

Event B: resources became available (resources were released), 286

Event C: validity of any WTRU 500 in the queue expired, 296

The physical resource manager performs the following tasks.

1) If an event happens, start procedure—go to step 2, 204, 206.
2) If Event A, then check if the request is for a reconfiguration, addition or handover, 210
   a. if reconfiguration or handover, go to step 5
   b. if addition, go to step 6
3) If Event B, then check if the queue is empty, 288
   a. If yes, go back to step 1, 294.
   b. If no, process the queue, 290, 292
4) If Event C, then go to procedure to update request, 298, 300
5) if reconfiguration or handover, check if the queue is empty or if ALL requests in the queue have WM=1 or WR=1 (that means they are waiting for measurement or new request, therefore they cannot be processed immediately) and the request is not in the queue (for the case of handover, the request is not in the queue), 212
   a. if yes (queue is "empty" and request is not in the queue, so it will be processed),
      i. set Flag M according to measurement availability, 214
      ii. set R=WM=WR=0, 216
      iii. Run procedure to process the reconfiguration or handover request, 218, 220
      iv. Check if the request can be supported, 222,
         1. if no, reject and delete the request
         2. if yes, check if M=0 (if M=1 then this is a low-rate allocation, request will be queued waiting for measurements), 224
            a. if yes, accept and delete the request, 230
            b. if no, accept the request and enqueue the request with
               CCTrCH ID
               M=WM=1
               WR=R=0
               $T_{first}=T_{latest}$=current time, 228
      v. Go back to step 1, 232
   b. if no (queue is not "empty" and request could be already in the queue), check if the request is in the queue (CCTrCH ID is in the queue) (for the case of handover, the request is not in the queue), 234
      i. if yes (request was in the queue waiting for measurements, so it will be processed, 240
         1. update flags M and WM according to measurements
         2. set R=WR=0
         3. set $T_{latest}$=current time
         4. $T_{first}$ is NOT changed
         5. Run procedure to process the reconfiguration request
         6. Check if request can be supported, 246,
            a. if yes, check if M=0 (if M=1 then this is a low-rate allocation, request will stay in the same position in the queue waiting for measurements), 248
               i. if yes, accept the request and remove the request from the queue, 252
               ii. if no, accept the request and keep the request in the queue, 250
            b. if no, reject the request and keep the request in the queue, 254
         7. Go back to step 1, 256
      ii. if no (request was not in the queue and the queue is not empty, so it will not be processed),
         1. reject and delete the request (request for back-to-back cannot be queued), 236
         2. go back to step 1, 256.
6) if addition, check if the queue is empty, 258
   a. if yes,
      i. enqueue the request with
         CCTrCH ID
         Flag M according to measurements
         R=WM=WR=0
         $T_{first}=T_{latest}$=current time, 260
      ii. check if there are any resources available in the cell (at least one timeslot+code available for each direction), 262
         1. If yes, 264,
            a. Run procedure to process the addition request, 266
            b. Check if request can be supported, 302,
               i. if yes, check if M=0 (if M=1 then this is a low-rate allocation, request will stay in the same position in the queue waiting for measurements), 304
                  1. if yes, accept the request and remove the request from the queue, 308
                  2. if no, accept the request and keep the request in the queue, 306
               ii. if no, continue
            c. Go back to step 1, 310
         2. If no, go back to step 1, 270
   b. If no, check if the request is already in the queue (CCTrCH ID already exists in the queue)
      i. If yes,
         1. update the following fields:
            Flags: M, WM according to measurements
            R=WR=0
            $T_{latest}$=current time
            $T_{first}$ is NOT changed, 272
         2. Go to 6)b.iii
      ii. If no,
         1. enqueue the request with
            CCTrCH ID
            Flag M according to measurements
            R=WM=WR=0
            $T_{first}=T_{latest}$=current time, 274
         2. Go to 6)b.iii
      iii. Check if there are resources available in the cell, 276
         1. If yes, 278,
            a. run procedure to process the addition request, 280
            b. Check if request can be supported, 302,
               i. if yes, check if M=0 (if M=1 then this is a low-rate allocation, request will stay in the same position in the queue waiting for measurements), 304
                  1. if yes, accept the request and remove the request from the queue, 308
                  2. if no, accept the request keep the request in the queue, 306
               ii. if no, continue
            c. Go back to step 1, 310
         2. If no, keep the request in the same position in the queue and go back to step 1, 282, 284.

Figure 10:
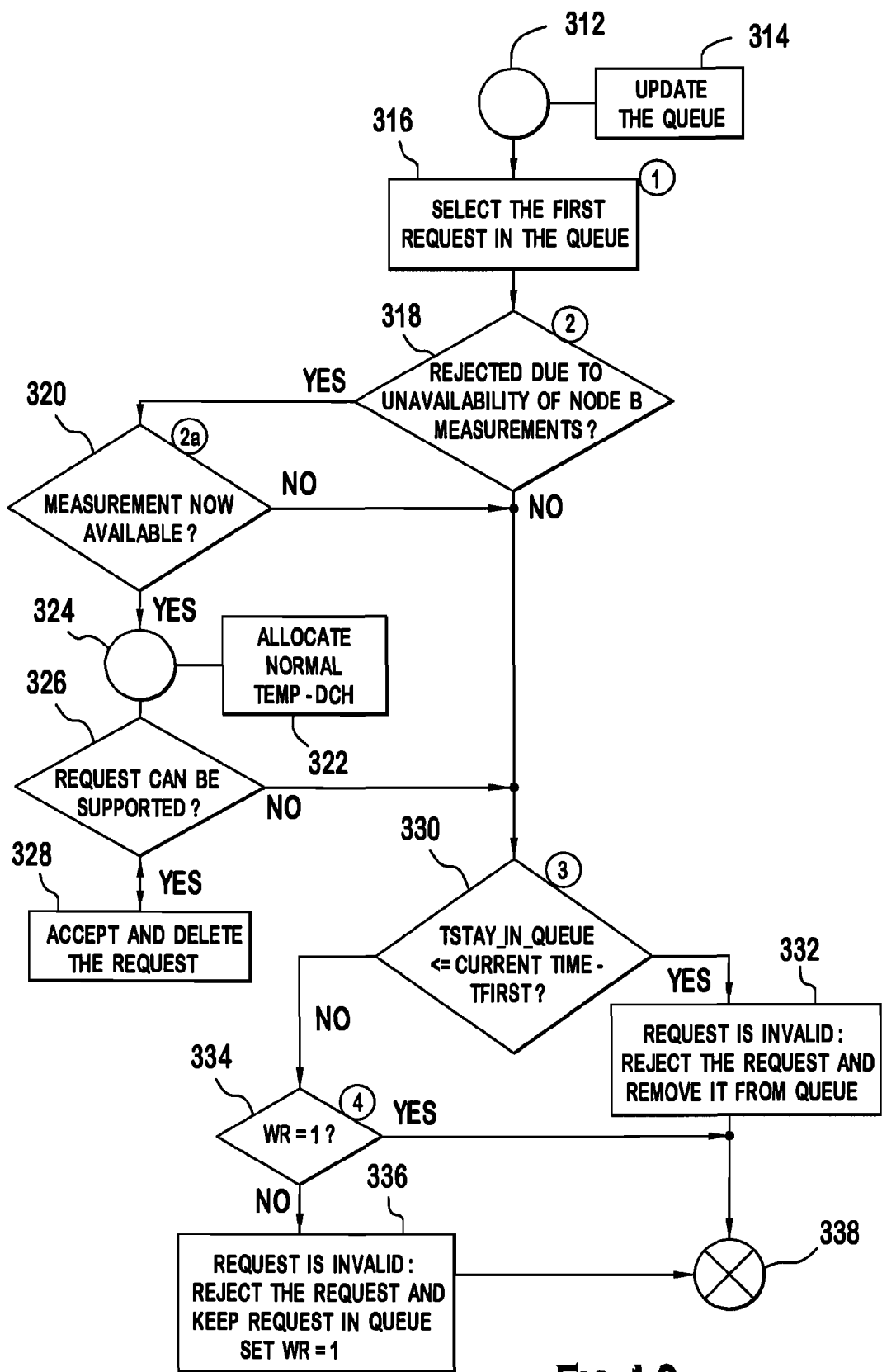
FIG. 10 is a flow chart for updating NRT requests.

The procedure to update requests is as follows and is shown by the flow chart of FIG. 10.
  1) Select the request with validity expired, 312, 314, 316
  2) Check if that request was rejected due to unavailability of Node-B measurements (if NB=1), 318
     a. if yes, check is measurements are now available, 320.
        i. if yes, 324 run procedure to perform normal allocation, 322. The input for this procedure will be the list of currently available timeslots and codes. Check if the request can be supported, 326
           1. if yes, accept the request and delete the request from the queue. The procedure is over, 328.
           2. if no, continue
        ii. if no, continue
     b. if no, continue
  3) Check if $T_{stay\_in\_queue}$<current time−$T_{first}$(time allowed to stay in queue expired), 330
  If no, continue
  If yes, the request is invalid. Reject the request and remove the request from the queue, 332. The procedure is over, 338.
  4) Check if WR=1 (waiting for new request), 334
     a. If yes, the procedure is over, 338
     b. if no, the request is invalid. Reject the request, keep the request in the queue and set WR=1, 336. The procedure is over, 338.

Figure 11:
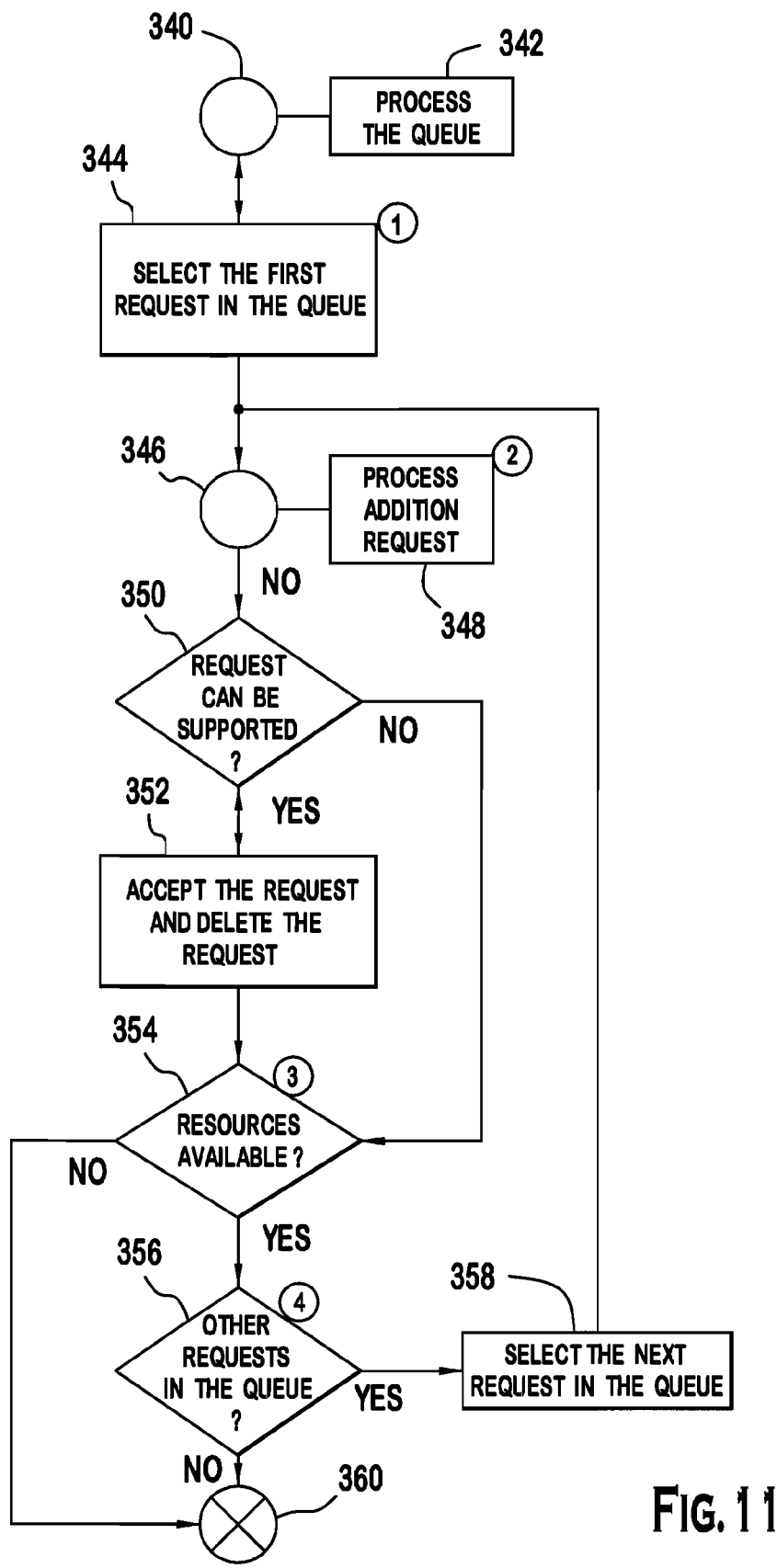
FIG. 11 is a flow chart for processing the NRT queue.

The procedure to process the queue is as follows and is shown in FIG. 11.
  1) Select the first request in the queue, 340, 342, 344
  2) Run the procedure to process the request, 346, 348. Check if the request can be supported, 350
     a. if yes, accept the request and delete the request from the queue, 352. Continue.
     b. if no, continue
  3) Check if there are still resources available in the cell, 354
     a. if yes, continue
     b. If no, procedure is over, 360
  4) Check if there are other requests in the queue, 356
     a. if yes, select the next request and go back to step 2, 358
     b. if no, the procedure is over, 360

Figure 12:
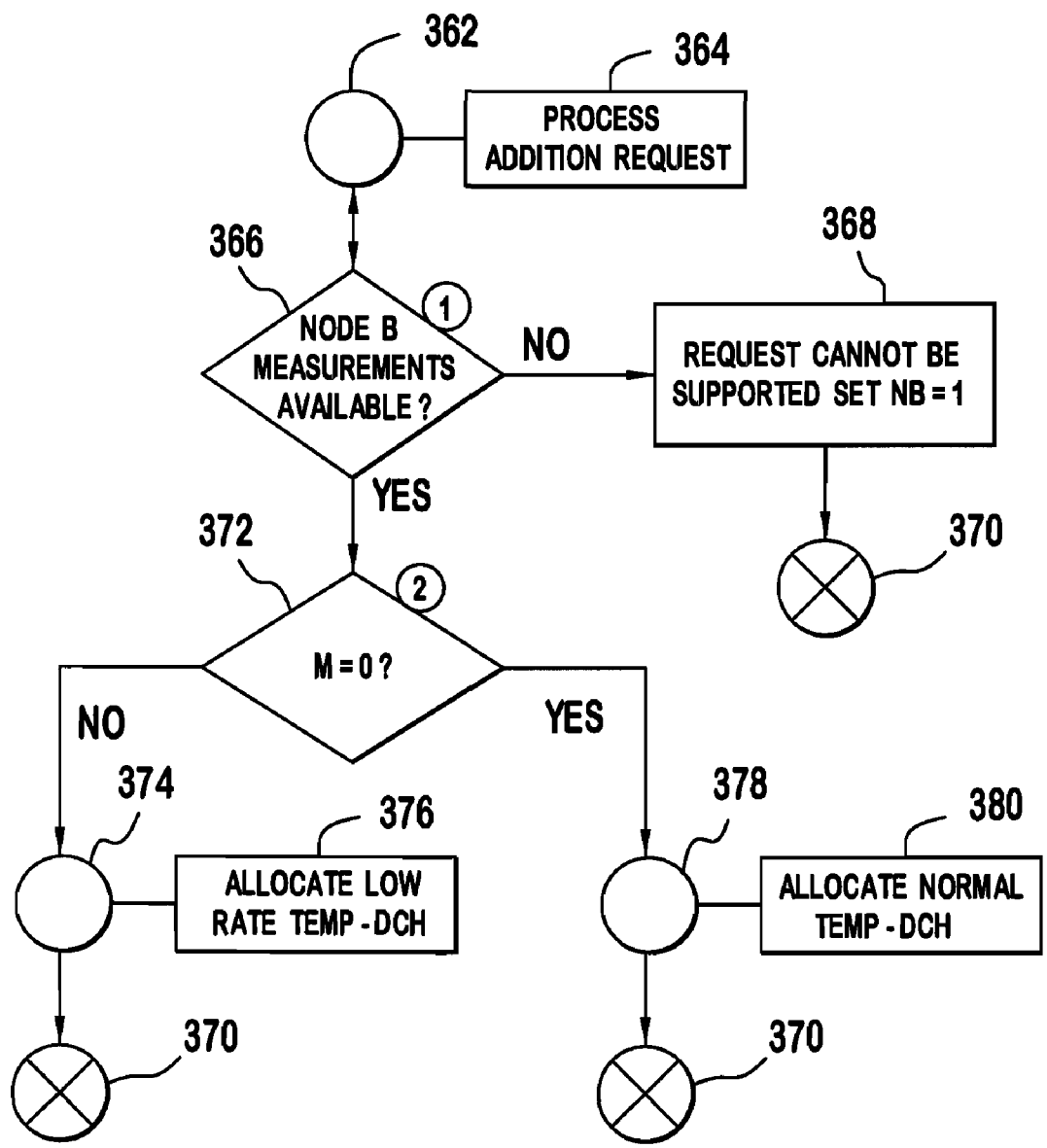
FIG. 12 is a flow chart for processing NRT requests for CCTrCH additions.
Figure 13:
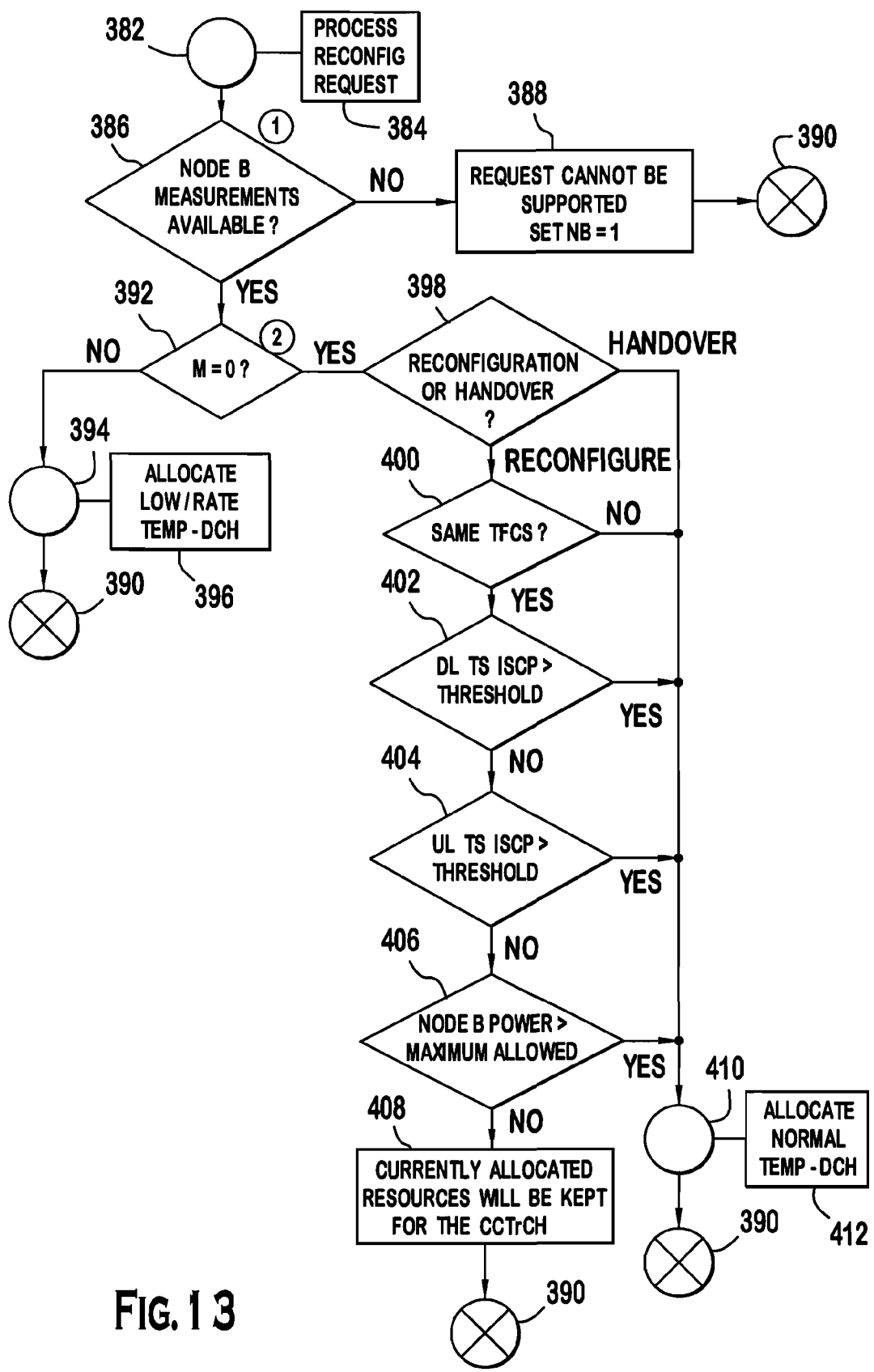
FIG. 13 is a flow chart for processing NRT requests for CCTrCH reconfiguration (back-to-back allocations) or handover.

The procedure to process a request for addition of a CCTrCH for a low rate temp-DCH allocation is as follows and is shown in FIG. 12, although other procedures may be used. One such alternate procedure is to run a variant of a fast dynamic channel allocation (F-DCA) call admission control algorithm that does not require measurements.
  1) Check if Node-B measurements are available, 362, 364, 366
     a. if yes, continue
     b. if no,
        i. request cannot be supported due to Node-B measurement unavailability
        ii. set NB=1, 368
  2) Check if M=0 (WTRU measurements are available/valid), 372
     a. If no, WTRU measurements are not available.
        i. Run procedure to allocate low-rate Temp-DCH. The input for this procedure will be the list of currently available timeslots and codes, 374, 376.
     b. If yes, WTRU measurements are available.
        i. Run procedure to perform normal allocation, 378, 380. The input for this procedure will be the list of currently available timeslots and codes.
  3) Complete procedure, 370

The procedure to process a request for reconfiguration is as follows.
  1) Check if Node-B measurements are available, 382, 384, 386
     a. if yes, continue
     b. if no,
        i. request cannot be supported due to Node-B measurements unavailability
        ii. set NB=1, 388
  2) Check if M=0 (WTRU measurements are available/valid), 392
     a. If no, WTRU measurements are not available. Run procedure to allocate low-rate Temp-DCH. The input for this procedure will be the list of currently available timeslots and codes plus the timeslots and codes currently being used by the CCTrCH being reconfigured, 394, 396.
     b. If yes, WTRU measurements are available. Check if this is a reconfiguration or handover request, 398
        i. If reconfiguration, check if the data rate requests (TFCS) is the same as the previously allocated to that CCTrCH, 400
           1. If yes, check if, in the last measurement report received:
           DL Timeslot ISCP was higher than a threshold, 402, or
           UL Timeslot ISCP was higher than a threshold, 404, or
           Node-B 502 reached the maximum allowed transmit power (Transmitted Carrier Power), 406
              a. if no, then the currently allocated resources will be kept for that CCTrCH, 408.
              b. if yes, run procedure to perform normal allocation. The input for this procedure will be the list of currently available timeslots and codes plus the timeslots and codes currently being used by the CCTrCH being reconfigured, 410, 412.
           2. If no, run procedure to perform normal allocation. The input for this procedure will be the list of currently available timeslots and codes plus the timeslots and codes currently being used by the CCTrCH being reconfigured, 410, 412.
        ii. If handover, run procedure to perform normal allocation. The input for this procedure will be the list of currently available timeslots and codes
  3) Complete Procedure, 390

Figure 14A:
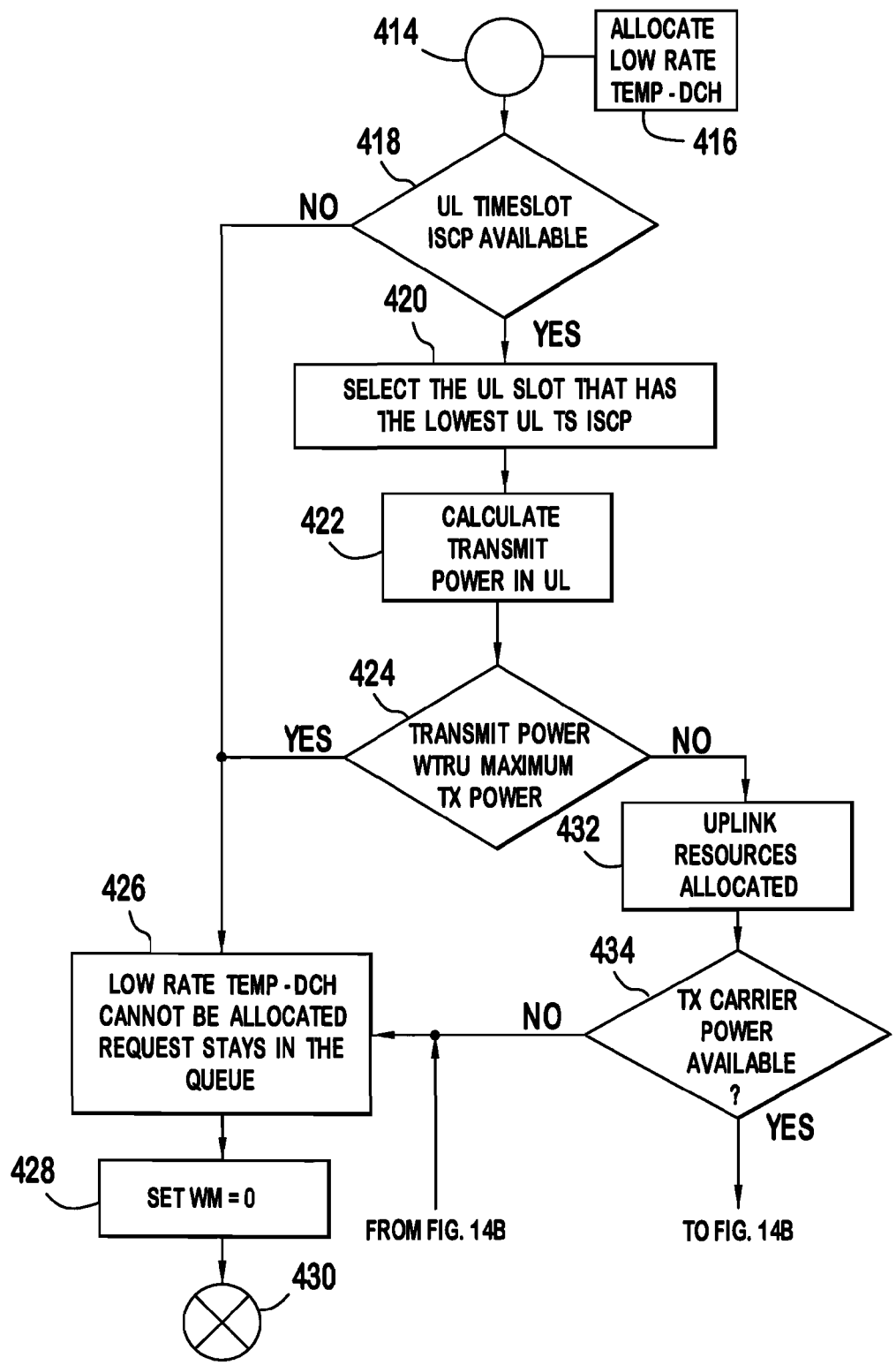
FIGS. 14 (14A and 14B) is a flow chart for allocating low-rate temp-DCH.
Figure 14B:
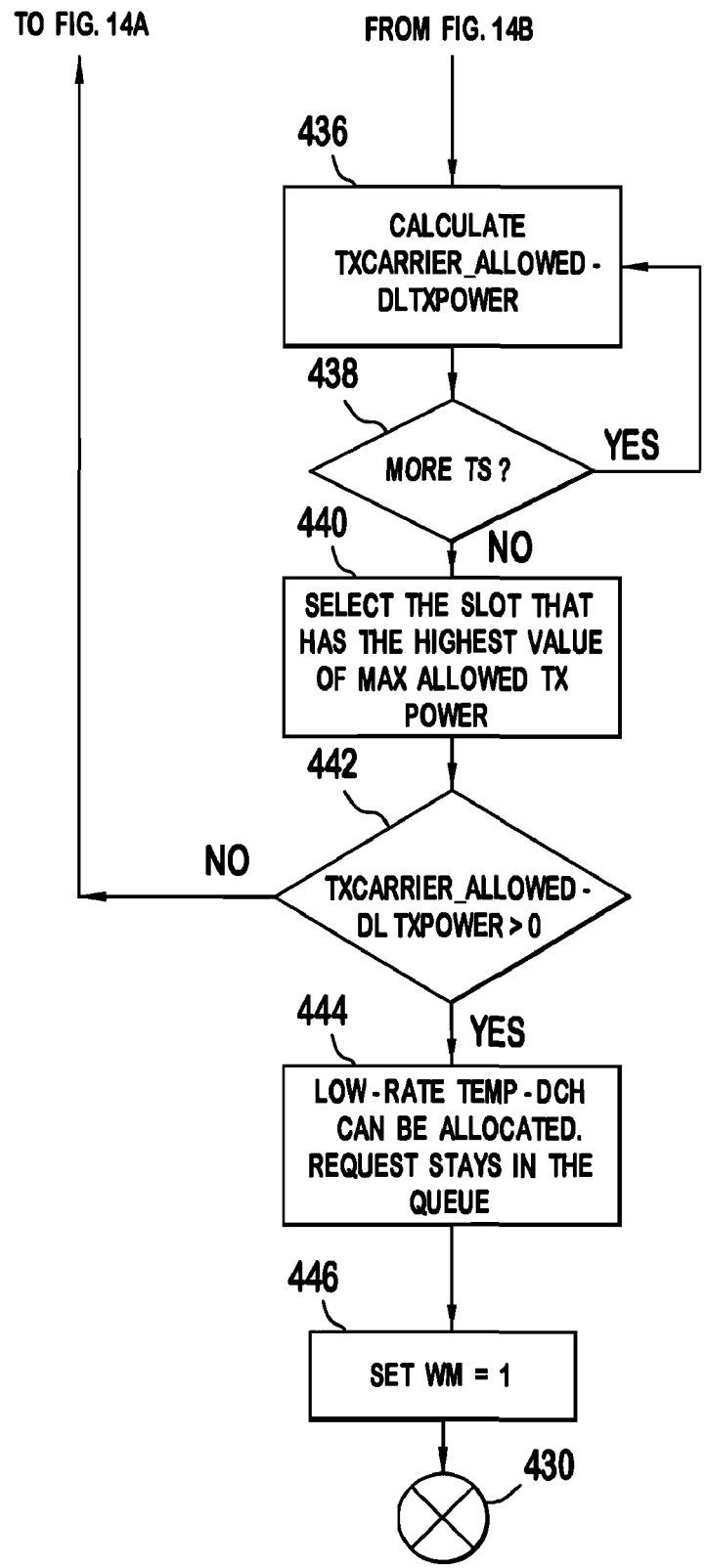

The procedure to allocate a low-rate TEMP-DCH is as follows and is shown in FIG. 14. The input for this procedure is the list of available timeslots and codes in the cell.
  1) Allocation of low-rate Temp-DCH in uplink, 414, 416, 418: Among al the uplink timeslots whose Rus are not totally used, select the timeslot that has the lowest ISCP, 420, as follows:
     a. In the uplink, uplink ISCP for each timeslot is known. WTRU TX power is estimated as Transmit Power=ISCP+PathLoss$_{95\%}$+SIR$_T$+Noise Rise+Margin PathLoss$_{95\%}$ is the maximum path loss for $95^{th}$ percentile of the distribution of WTRU's path loss in this cell, which is computed as follows:

PathLoss$_{95\%}$=95% of the radius of the cell+2σ where σ is the standard deviation of lognormal fading, which is a design parameter, 422.
     Noise Rise is the noise rise estimate which could be obtained, such as by simulation using path loss value of PathLoss$_{95\%}$.

b. Check if Transmit Power>WTRU maximum TX power
   i. if yes, no need to check other timeslots because they have higher UL ISCP. No uplink timeslot can accommodate the low-rate Temp-DCH. Go to step 3
   ii. if no, uplink resource is successfully allocated, 432. Go to step 2
2) Allocation of low-rate Temp-DCH in downlink: For each available DL timeslot (at least one code available), perform the following calculation
   a. In the downlink, only Node-B Carrier Power of each timeslot is known for the serving cell and neighboring cells, 434.
       Let $TXPower_{95\%}$ denote the DL transmit power for $95^{th}$ percentile of the distribution of DL transmit power in this cell given an average Node-B carrier power in the neighboring cells. The value of $TXPower_{95\%}$ for a given timeslot in the cell is given as:

$$TXPower_{95\%} = SIR_{target} \left( \alpha TXCARRIER_{serving} + \beta \sum_{neighbor} TXCARRIER_{neighbor} \right)$$

Where $TXCARRIER_{serving}$ denote the serving cell TX carrier power (unit is watts) in the time timeslot, and $\alpha$ and $\beta$ are design parameters.
   Let $TXCARRIER_{max}$ denote the maximum TX carrier power (unit is watts) in the timeslot. Then, the maximum allowed TX power for the UE in the timeslot, $TXCARRIER_{allowed}$, is $TXCARRIER_{max} - TXCARRIER_{serving}$.
   Compute the value of $TXCARRIER_{allowed}$ − TX Power$_{95\%}$, 436.
   b. Among all downlink timeslots, select the timeslot that has the highest value of $TXCARRIER_{allowed}$ − TX Power$_{95\%}$, 440. Check if its value of ($TXCARRIER_{allowed}$ − TX Power$_{95\%}$)>0, 442.
       i. if no, that means no downlink timeslot can accommodate this low-rate Temp-DCH. Go to step 3
       ii. if yes, downlink resource is successfully allocates. Go to step 4
3) Low-rate Temp-DCH cannot be allocated, 426. Set WM=0, 428. Procedure is over, 430.
4) Low-rate Temp-DCH can be allocated, 444. Set WM=1, 446. Procedure is over, 430.

Figure 15:
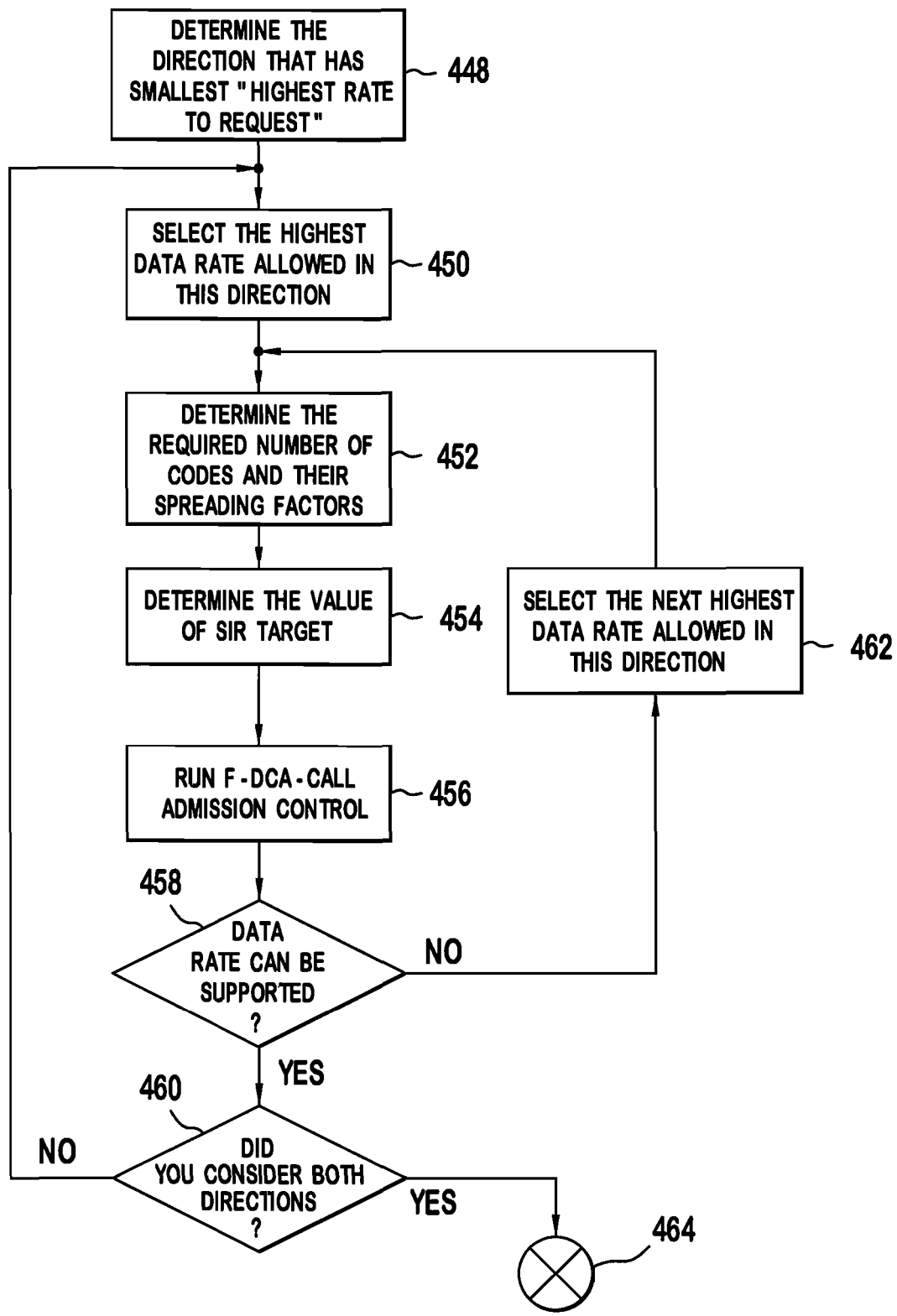
FIG. 15 is a flow chart for allocating normal temp-DCH.

The procedure to allocate "Normal" temp-DCH is as follows and is shown in FIG. 15. The input for this procedure is the list of available timeslots and codes in the cell.

1) In the NRT request, there is a "highest rate to request" in both directions, 448. Consider the direction that has smallest "highest rate to request" first. Check all the rates in the request in the order of the decreasing rate to see which rate can be supported by the currently available resources until it finds that a rate can be supported, as follows:
   a. Select the highest data rate allowed in this direction, 450
   b. Determine the required number of codes and their spreading factors,
   c. Determine the value of SIR target to be used in the resource allocation, 454.
   d. Run F-DCA-Call Admission Control using the list of available timeslots and codes for the cell, 456. Check if this data rate can be supported, 458
       i. if yes, then this request is approved and this rate is the rate to be allocated in this direction. Go to step 2.
       ii. if no, check if this is the lowest data rate allowed. The lowest acceptable rate is the minimum DTCH data rate greater than zero.
          1. if yes, go to step 3
          2. if no, select the next highest data rate allowed in this direction and go back to step 1.b, 462
2) Consider the direction that has the largest "highest rate to request". Check all the rates in the request in the order of the decreasing rate to see which rate can be supported by the currently available resources until it finds that a rate can be supported.
   a. Select the highest data rate allowed in this direction, 450
   b. Determine the required number of codes and their spreading factors, 452
   c. Determine the value of SIR target to be used in the resource allocation, 454.
   d. Run F-DCA-Call Admission Control using the list of available timeslots and codes for the cell, 456. Check if this data rate can be supported, 458
       i. if yes, then this request is approved and this rate is the rate to be allocated in this direction, 460.
       ii. if no, check if this is the lowest data rate allowed. The lowest acceptable rate is the minimum DTCH data rate greater than zero.
          1. if yes, go to step 3
          2. if no, select the next highest data rate allowed in this direction and go back to step 2.b
3) Resources cannot be allocated. This request cannot be supported by currently available resources.
4) Process Complete, 464.

If physical resource manager is successful in assigning resources for the service, the C-RNC 506 sends a "Radio Link Setup Request" (NBAP) message, 170, to the Node-B 502. The message contains the CCTrCH information necessary for the Node-B 502 to reserve the necessary resources and configure the new radio link, as follows.

CCTrCH information:
CCTrCH ID
TFCS
TFCI coding
Puncturing Limit (PL)
TPC information
Physical channel information
Timeslot information
Channelization codes
Frame allocation (continuous)
Downlink power control information
Initial DL transmit power
Maximum and minimum DL transmit power
TPC step size
TPC CCTrCH list
UE measurements
DL Timeslot ISCP
Special burst scheduling period (for DL transmission of special bursts)

In case of failure in the physical resource manager (e.g., resources not available), the C-RNC 506 sends a "Radio Link Setup Failure" (RNSAP) message to the S-RNC 508. The Node-B 502 does not have to be notified in case of the failure of the physical resource manager (PRM).

If the radio link is successfully configured, Node-B 502 starts transmission of data or special bursts and reception on the new physical channel. Node-B 502 responds to the C-RNC 506 with a "Radio Link Setup Response" (NBAP)

message, 172. If the configuration of the radio link was unsuccessful, Node-B 502 responds with a "Radio Link Setup Failure" (NBAP) message.

After the C-RNC 506 receives the "Radio Link Setup response" from the Node-B 502, it informs the S-RNC 508 of the assigned physical resources and the allocated rate for the NRT CCTrCH, by sending a "Radio Link Setup Response" (RNSAP) message to the S-RNC 508, 174. This message contains the following information.

Physical channel information
Timeslot information
Channelization codes
Frame allocation (continuous)
The "allowed rate information" in the "DCH Information Response" to indicate the TFI corresponding to the highest allowed bit rate for the uplink and/or the downlink of a DCH.
Downlink power control information
Maximum and minimum DL transmit power
Uplink power control information
Initial UL SIR target
Maximum and minimum UL SIR target
Maximum allowed UL transmit power
Node-B Measurements
UL Timeslot ISCP
P-CCPCH transmit power In case the resources cannot be successfully allocated, or if there is a problem with Node-B configuration, if the C-RNC 506 sends a "Radio Link Setup Failure" (NBAP) message from the Node-B 502, it will send a "Radio Link Setup Failure" (RNSAP) message to the S-RNC 508.

After the S-RNC 508 receives the "Radio Link Setup Response" message, it determines the activation time and duration of the Temp-DCH, 176. The NRT-TM in the S-RNC 508 determines the "activation time" of the temp-DCH as follows.

1. The S-RNC 508 determines the "minimum activation time", which is calculated taking into account the delays in the messages. This is given as $\tau_{setup}$ time units from the current CFN ($\tau_{setup}$ is the time it takes to setup a physical channel in the UE).
2. If there is already a CCTrCH allocated for that service (in which case this is a back-to-back allocation), the S-RNC 508 determines the CFN where the duration of the previous allocation expires, $CFN_{duration}$.
   a. If the "minimum activation time"≦$CFN_{duration}$, then "activation time"=$CFN_{duration}$
   b. If the "minimum activation time">$CFN_{duration}$, then back-to-back request cannot be supported.
3. If there is no CCTrCH allocated for that service, then "activation time"="minimum activation time".

The data transmission can only start in a given CCTrCH at the TTI boundary of that CCTrCH. The TTI boundary for a CCTrCH is given by the CFN such that:

$$CFN \bmod TTI_{longest}=0$$

where $TTI_{longest}$ is the longest TTI in the CCTrCH. If the activation time determination is not TTI aligned, the S-RNC 508 chooses the next largest CFN that is TTI aligned.

One approach to determine the duration of a "normal" temp-DCH is as follows, although others may be used, such as when measurements are available. In case the WTRU measurements are not available, a low-rate temp-DCH will be allocated to the WTRU 500. When determining the duration, the S-RNC 508 takes into account the fact that measurements were not available and this is a low-rate temp-DCH allocation (only for the WTRU 500 to send measurements).

However, the C-RNC 506 may allocate a low-rate to the WTRU 500 even when measurements are available (e.g., in case physical resources are not available in that cell). In that case, the duration is determined by the S-RNC 508 by considering this as a "normal" temp-DCH allocation (since this allocation is not only to receive measurements).

The NRT-TM in the S-RNC 508 determines the duration of the temp-DCH, $T_{duration}$, as follows. BO is the buffer occupancy and $R_{max}$ be the maximum data rate allocated to the Temp-DCH. The duration is preferably calculated as follows.

$$T_{tx}=BO/R_{max}$$

The calculated duration of the Temp-DCH is a multiple of the longest transmission time interval (TTI) length in the TFCS of the CCTrCH, $T_{longest}$. The calculated duration, $T_{duration}$, is computed as follows.

$$T_{duration} = \left\lceil \frac{T_{tx}}{TTI_{longest}} \right\rceil TTI_{longest}$$

The allocated duration for temp-DCH does not exceed the maximum duration $T_{max}$ and cannot be less than the minimum duration, $T_{min}$. As a result, the following occurs.

If the calculated duration $T_{duration}$ is no greater than $T_{max}$, then allocated duration takes the value of calculated duration. Otherwise, allocated duration takes the value of maximum duration $T_{max}$.

If the calculated duration $T_{duration}$ is no less than $T_{min}$, then allocated duration takes the value of calculated duration. Otherwise, allocated duration takes the value of maximum duration $T_{min}$.

For low-rate temp-DCH, the duration is preferably always fixed, $T_{sr}$. The S-RNC 508 notifies the WTRU 500 of any changes in transport channel information and the new physical channel configuration, 177. The changes in transport channel information can be a change in data rate (TFC subset) and/or a change in the beta factors in the TFCS. In order to configure the WTRU 500, the S-RNC 508 performs as follows.

In case there are no changes in the transport channel information, send a "Physical Channel Reconfiguration" (RRC) message.

In case the TFCS changes (changes in the beta factors) or the data rate changes (change the TFC subset), send a "Transport Channel Reconfiguration" (RRC) message The message is sent on the DCCH/FACH and it contains the following.
CCTrCH information (if applicable)
CCTrCH ID (TFCS ID)
new TFCS (if applicable)
TFC Subset (if applicable)
Physical channel information
timeslot information
channelization codes
frame allocation (continuous)
Downlink power control information
DL TPC step size
UL CCTrCH TPC list
Uplink power control information
UL SIR target
Maximum allowed UL transmit power
Node B measurements
Uplink Timeslot ISCP (present only if data rate is 1 or 2 Mbps, otherwise the values are sent on the BCH)

When receiving the reconfiguration message, the WTRU RRC performs the following, 178.

Configure the physical layer with the physical channel information and the new transport channel information received in the message.

Configure the MAC layer with the new transport channel information (in case of changes in transport channel information) and the new radio bearer mapping information received in the message.

After receiving a confirmation from the physical layer that the DPCH was successfully established, the WTRU RRC performs the following.

Send a "Complete" message to the S-RNC 508 over the DCCH/Temp-DCH, 182.

TVMs are collected at the S-RNC 508, 188 and measurement reports are sent from the WTRU 500 to the S-RNC 508, 186.

After receiving the "Complete" message, the S-RNC RRC performs notifies the MAC-d that downlink transmission on the DCCH can start.

Before the end of the temp-DCH duration, the S-RNC 508 decides if an extension of the duration will be required, 188. The extension of the duration is a new allocation at the UE side: the duration of the previously allocated temp-DCH will expire, and a new temp-DCH will be configured. This procedure is called a "back-to-back allocation".

The decision of whether or not to request a back-to-back allocation is made based on the latest received Traffic Volume Measurements. This decision is made $T_{back-to-back}$ ms before the duration expires. $T_{back-to-back}$ takes into account the delay through the system in order to allow for an allocation of a new temp-DCH before the duration of the previously allocated temp-DCH expires. $T_{back-to-back}$ is determined by O&M. The decision is made as follows.

$BO_{end}$ is the buffer occupancy reported, $R_{current}$ is the maximum data rate currently allocated to the temp-DCH and $D_{left}$ the duration left for the current temp-DCH. The traffic volume at the end of the duration is given by $$TVM = BO - R_{current} \cdot D_{left}$$

Back-to-back is requested if TVM is greater than zero. If back-to-back allocations will not be requested, the S-RNC 508 will configure the CCTrCH to be deleted.

If a back-to-back allocation is not required, the S-RNC 508 configures the C-RNC 506 and the Node-B 502 to release the CCTrCH at the end of the duration, using a synchronized procedure, 202, such as follows.

S-RNC 508 sends a "Radio Link Reconfiguration Prepare" (RNSAP) message to the C-RNC 506 with the ID of the CCTrCH to delete.

The C-RNC 506 forwards the request to the Node-B 502 in the "Radio Link Reconfiguration Prepare" (NBAP) message.

The Node-B 502 responds with a "Radio Link Reconfiguration Ready" (NBAP) message to the C-RNC 506.

The C-RNC 506 forwards the response to the S-RNC 508 in the "Radio Link Reconfiguration Ready" (RNSAP) message.

The S-RNC 508 sends a "RL Reconfiguration Commiit" (RNSAP) message to the C-RNC 506, with the CFN in which the deletion must take effect.

The C-RNC 506 forwards "RL Reconfiguration Commit" (NBAP) message to Node-B 502.

At the end of the duration, the WTRU 500 releases the temporary dedicated physical channels. The transport channel information (TFS and TFCS) remains the same.

At the end of the duration, the Node-B 502 and C-RNC 506 releases the CCTrCH. The physical resources are released and the TFCS information are deleted. The TFS remains the same.

Figure 16A:
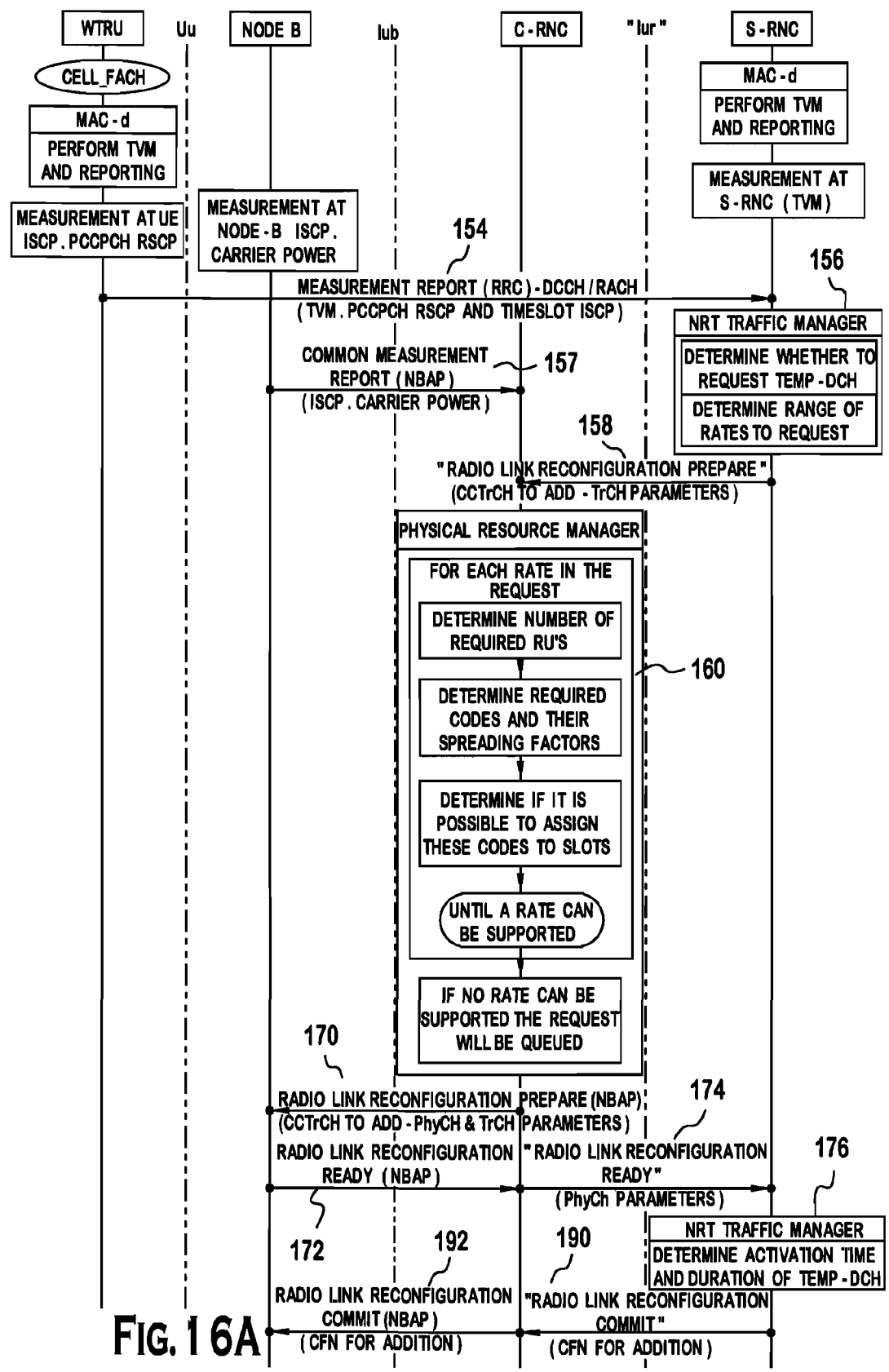
FIGS. 16 (16A and 16B) is a messaging diagram for the radio resource management functions for subsequent temp-DCH allocations.
Figure 16B:
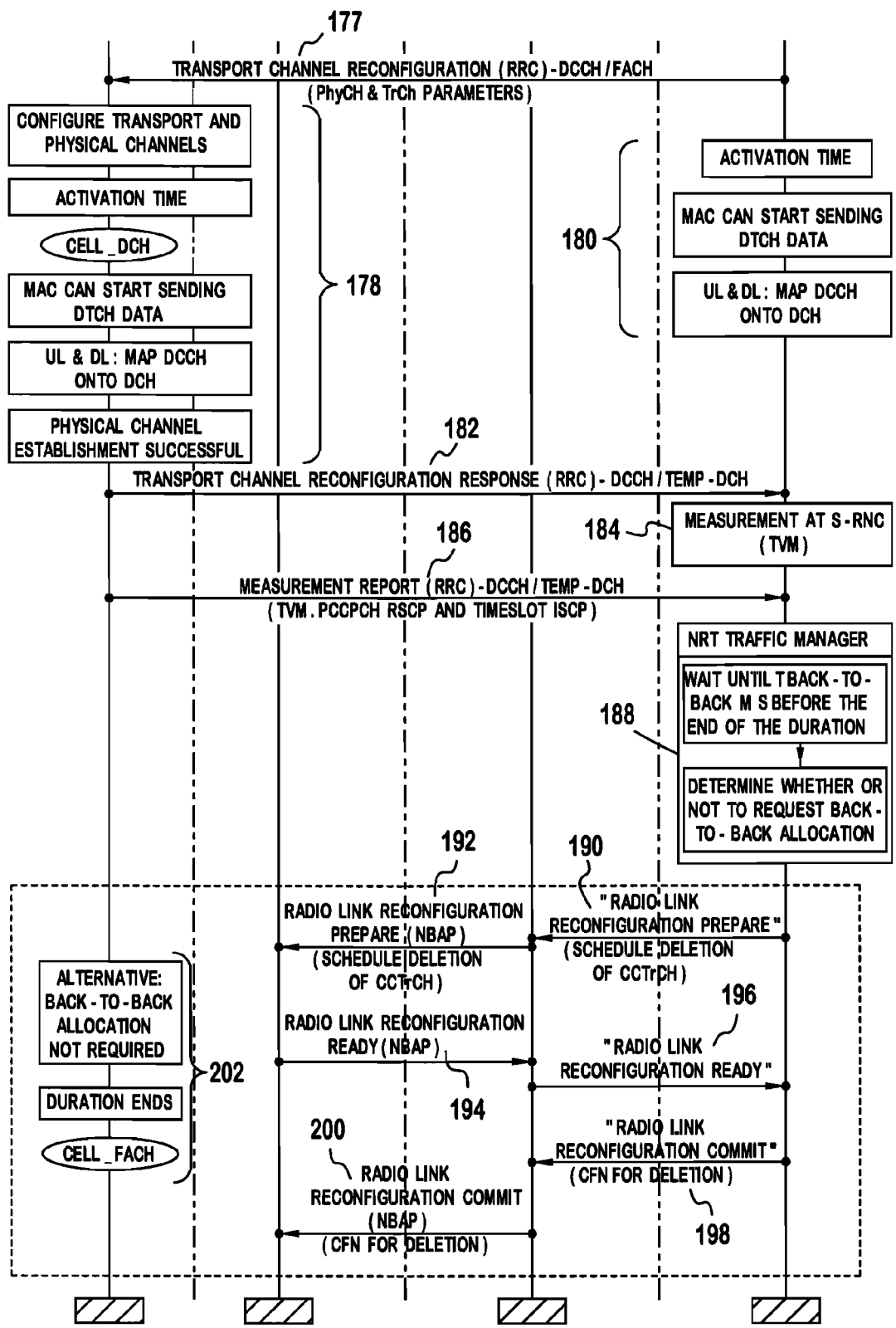

Subsequent allocations (after the first Radio Link Setup procedure) can be a back-to-back allocation (the WTRU 500 is in CELL_DCH with Temp-DCH assigned) or just a "normal" allocation (the WTRU 500 is in CELL_FACH) as shown in FIG. 16.

When back-to-back allocations are not required, the (subsequent) allocation follows the same steps as in the first allocation with the exception that a synchronized reconfiguration procedure with a "CCTrCH to add" is used in the UTRAN side after the S-RNC 508 determines the rates to request.

When the WTRU 500 measurements are available, the signaling of the RRM functions for subsequent temp-DCH allocations is as follows. The activation of Temp-DCH is based on threshold crossing of the traffic volume.

Once the NRT-TM decides to allocate a Temp-DCH for a CCTrCH, it determines the rates to request for this CCTrCH as previously described. The S-RNC 508 sends a "Radio Link Reconfiguration Prepare" (RNSAP) message to the C-RNC 506 with a "CCTrCH to add" message, 190.

This message includes the following.
Allowed queuing time (input from O&M)
CCTrCH to add
CCTrCH ID
TFCS (represents the maximum desired and minimum allowed data rates)
TFCI coding
Puncturing Limit (PL)
Downlink power control information
TPC CCTrCH list
Transport channel information
TrCH ID
TFS
Target BLER for each transport channel
Transport channel source statistics descriptor (used to distinguish between RT and NRT) as shown in Table 1.
UE Measurements
P-CCPCH RSCP
Timeslot ISCP The processing of the request by the physical resource manager is performed in the same manner as in the first temp-DCH allocation for a single service case. In the case of a failure in the physical resource manager (e.g., resources are not available), the C-RNC 506 sends a "Radio Link Reconfiguration Failure" (RNSAP) message to the S-RNC 508. The Node-B 502 does not have to be notified in case of the failure of the physical resource manager (PRM).

If Physical Resource Manager is successful in assigning resources for the service, the C-RNC 506 sends a "Radio Link Reconfiguration Prepare" (NBAP) message to the Node-B 502, 192. The message contains the CCTrCH information necessary for the Node-B 502 to reserve the necessary resources and configure the new radio link, as follows.
CCTrCH to add
CCTrCH ID
TFCS
TFCI coding
Puncturing Limit (PL)
Physical channel information
Timeslot information
Channelization codes
Frame allocation (continuous)
Downlink power control information
Initial DL transmit power
Maximum and minimum DL transmit power
TPC CCTrCH list If the resources are successfully reserved, Node-B 502 responds to the C-RNC 506 with a "Radio Link Reconfiguration Ready" (NBAP) message, 194. If the configuration of the radio link was unsuccessful, Node-B 502 responds with a "Radio Link Reconfiguration Failure" (NBAP) message.

The S-RNC 508 of the assigned physical resources and the allocated rate for the NRT CCTrCH, are performed by sending a "Radio Link Reconfiguration Ready" (RNSAP) message to the S-RNC 508, 196. This message contains the following information.

Physical channel information
Timeslot information
Channelization codes
Frame allocation (continuous)
The "allowed rate information" in the "DCH Information Response" to indicate the TFI corresponding to the highest allowed bit rate for the uplink and/or the downlink of a DCH.
Downlink power control information
Maximum and minimum DL transmit power
Node-B Measurements
UL Timeslot ISCP
P-CCPCH transmit power In case the resources cannot be successfully allocated, or if there is a problem with Node-B configuration, if the C-RNC 506 sends a "Radio Link Setup Failure" (NPAB) message from the Node-B 502, it sends a "Radio Link Setup Failure" (RNSAP) message to the S-RNC 508. If successful, the S-RNC 508 sends the Node-B 502 via the C-RNC 506 a "Radio Link Reconfiguration Commit" message, 190, 192.

The determining of whether or not to request a back-to-back allocation and the procedures when a back-to-back allocation is not needed are as previously described. If a back-to-back allocation is needed, the NRT-TM in the S-RNC 508 determines the rates to request and send a request to the C-RNC 506 to modify the CCTrCH ("CCTrCH to modify" in the "Radio Link Reconfiguration Prepare" message).

If back-to-back allocations will be requested, the NRT-TM determines the rates to request. Rates to request are calculated, where TVM takes the value as follows.

$$TVM = BO_{end} - R_{current} \cdot D_{left}$$

$BO_{end}$ is the buffer occupancy reported, $R_{current}$ is the maximum data rate currently allocated to the temp-DCH and $D_{left}$ is the duration left for the current temp-DCH.

After the range of rates to request is determined, the S-RNC 508 sends a "Radio Link Reconfiguration Prepare" (RNSAP) message to the C-RNC 506 with the "CCTrCH to modify", including as follows.

The ID of the CCTrCH to modify.
The new TFCS. If the TFCS information is the same as the previous one, the new TFCS does not need to be sent.
WTRU Measurements When receiving the request for a reconfiguration, the C-RNC 506 checks if there are any requests pending. If there are no other requests pending, the request is be processed as previously described. After the request is processed, if the allocation is successful (resources are available), the C-RNC 506 forwards the request to the Node-B 502 in the "Radio Link Reconfiguration Prepare" (NBAP) message with the newly allocated physical resources.

If the reconfiguration (i.e., back-to-back allocation) cannot be performed (e.g., because there are other requests pending for the same cell or Node-B 502 cannot support the configuration), the C-RNC 506 responds with a "Radio Link Reconfiguration Failure" (RNSAP) message to the S-RNC 508. In this case, after receiving the failure response, the S-RNC 508 configures the CCTrCH to be deleted at the end of the duration (using a synchronized reconfiguration procedure). In this case, after the duration is over, the S-RNC 508 sends a new request to add a new CCTrCH. If this new request for addition of CCTrCH cannot be served immediately, it will be queued at the C-RNC 506.

If there are changes in the physical resources, the following applies. If Physical Resource Manager is successful in assigning resources for the service, the C-RNC 506 sends a "Radio Link Reconfiguration Prepare" (NBAP) message to the Node-B 502. The message contains the CCTrCH information necessary for the Node-B 502 to reserve the necessary resources and configure the new radio link, as follows.

CCTrCH to modify
ID of the CCTrCH to modify
The new TFCS. If the TFCS information is the same as the previous one, the new TFCS does not need to be sent.
Physical channel information
Timeslot information
Channelization codes
Frame allocation (continuous)
Downlink power control information
TPC CCTrCH list In one possible implementations, although others may be used, the Node-B 502 will only be notified of a back-to-back allocation in case there are changes in the physical resources. If the physical resources remain the same, since Node-B 502 is not configured with a "duration", the back-to-back allocation will transparent to Node-B 502.

If there are changes in the physical resources, the following applies. The sending of the radio link reconfiguration ready to the S-RNC 508 and the NRT traffic manager determining activation time and duration are performed as previously described.

After receiving the response from the C-RNC 506, if the allocation is successful, the S-RNC NRT-TM calculates the activation time and duration. If the CFN for the activation time is greater than the CFN where the duration of the previous Temp-DCH ends, then back-to-back allocation cannot be supported (since the WTRU 500 will release the old Temp-DCH and there will be no new Temp-DCH assigned). In this case, the S-RNC 508 will cancel the reconfiguration by sending a "Radio Link Reconfiguration Cancel" (RNSAP) message to the C-RNC 506 and then configure the deletion of the CCTrCH (by using a synchronized procedure.

If the activation time is valid, the UTRAN RRC configures the MAC layer with the new transport channel information (in case of changes in transport channel information). The sending of the new configuration to the WTRU 500 is the same as previously described, except that the messages is sent on the DCCH/Temp-DCH.

When receiving the reconfiguration message, the WTRU RRC configures the lower layers, as follows.

Configure the physical layer with the physical channel information and the new transport channel information received in the message.
Configure the MAC layer with the new transport channel information (in case of changes in transport channel information).

The sending of the response to the UTRAN and the receiving of the response from the WTRU 500 are performed as previously described.

If the Traffic Volume Measurement in the downlink (S-RNC 508) is the one that triggered the temp-DCH allocation, no intra-frequency measurements is reported by the WTRU 500. In this case, the NRT-TM in the S-RNC 508 sends the request to the PRM in the C-RNC 506 without the measurements.

If there is no radio link established in that cell for that WTRU 500, a Radio Link Setup procedure will be used by the S-RNC 508 to establish a low-rate Temp-DCH; otherwise, a synchronized reconfiguration procedure will be used by the S-RNC 508. When receiving the request without measurements, the PRM in the C-RNC 506 processes the request. A low-rate Temp-DCH is allocated to the WTRU 500. The C-RNC 506 makes the decision to allocate a low rate. The S-RNC 508 sends the request to the C-RNC 506 with the highest and lowest rate to request as it would for any other procedure.

When the NRT-TM receives the response from the C-RNC 506 (with the DPCH information), it determines the low-rate Temp-DCH activation time and duration. When determining the duration, the S-RNC 508 will take into account the fact that measurements were not available and this is a low-rate temp-DCH allocation.

The C-RNC 506 may allocate a low-rate to the WTRU 500 even when measurements are available (e.g., in case physical resources are not available in that cell). In that case, the duration is determined by the S-RNC 508 by considering this as a "normal" temp-DCH allocation (since this allocation is not only to receive measurements).

The S-RNC RRC configures the lower layers and sends the new configuration to the WTRU 500. The WTRU RRC configures the lower layers and sends the response to the UTRAN. The UTRAN proceeds as previously described. After the low-rate Temp-DCH is allocated, data transmission initiation will follow the rules as previously described.

When the S-RNC 508 receives the TVM report from the WTRU 500, together with the intra-frequency measurements, the S-RNC 508 will determine if another allocation is required (i.e., if back-to-back is required) and, if required, the range of rates to request for the back-to-back allocation. The S-RNC 508 will send the "Radio Link Reconfiguration Prepare" message with "CCTrCH to modify", at this time together with the measurements. The C-RNC 506 will then process the request as previously described. If the allocation by the PRM is successful, the S-RNC 508 will determine the activation time and duration of the new Temp-DCH. If the activation time is valid, the S-RNC RRC will configure the lower layers and sends the new configuration to the WTRU 500. The WTRU RRC configures the lower layers, as previously described.

Figure 17A:
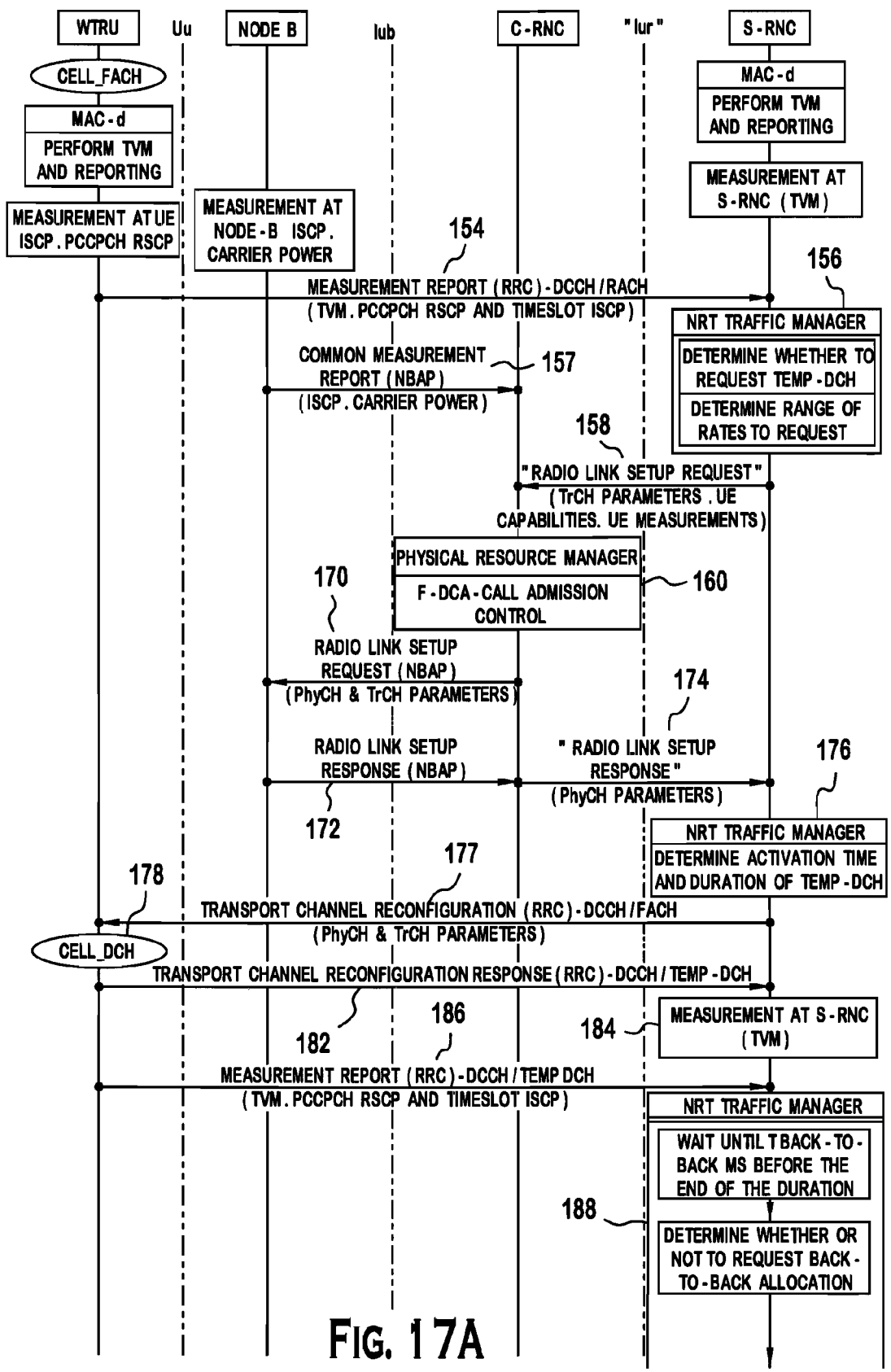
FIGS. 17 (17A and 17B) is a messaging diagram for a successful allocation of a back-to-back request.
Figure 17B:
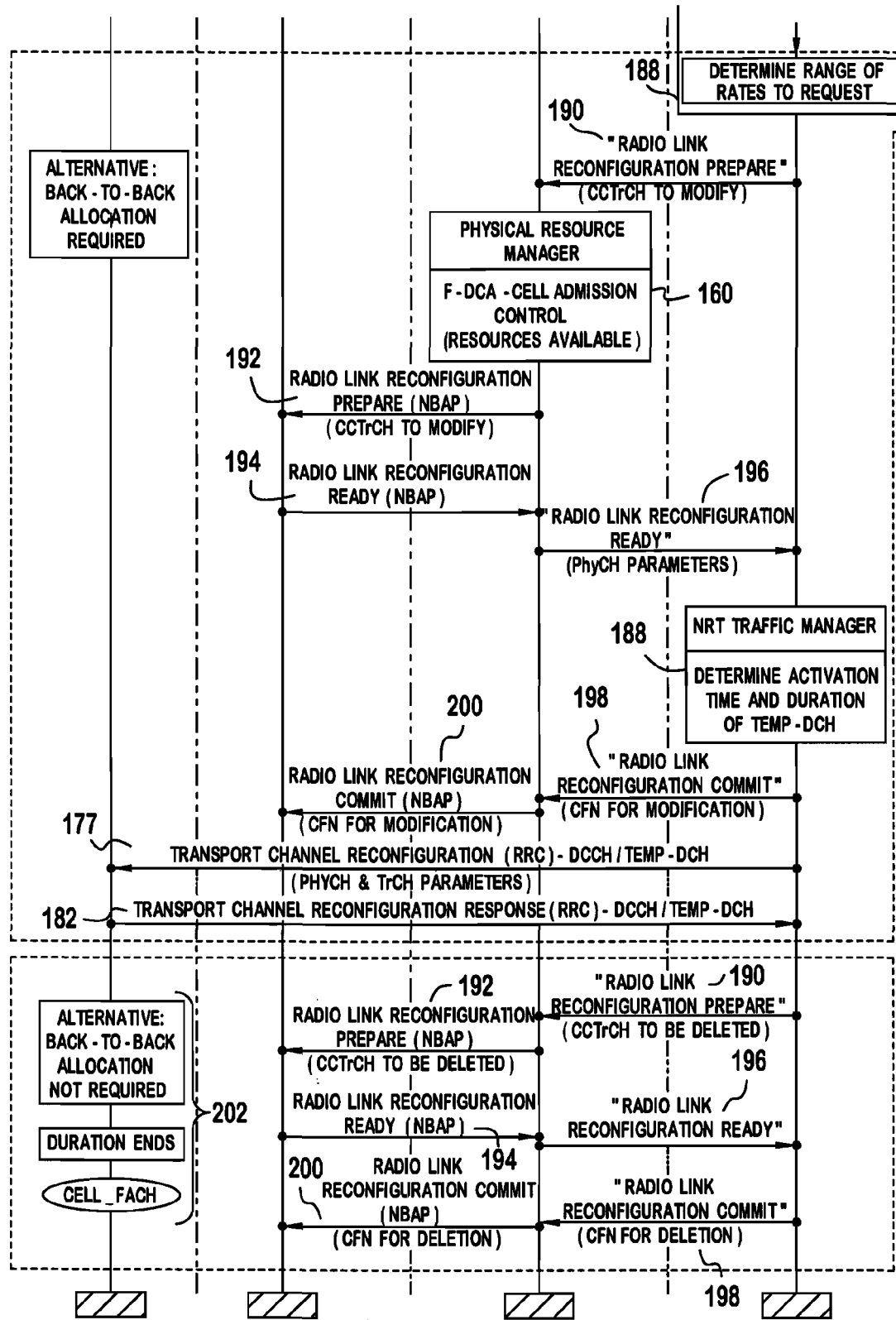
Figure 18A:
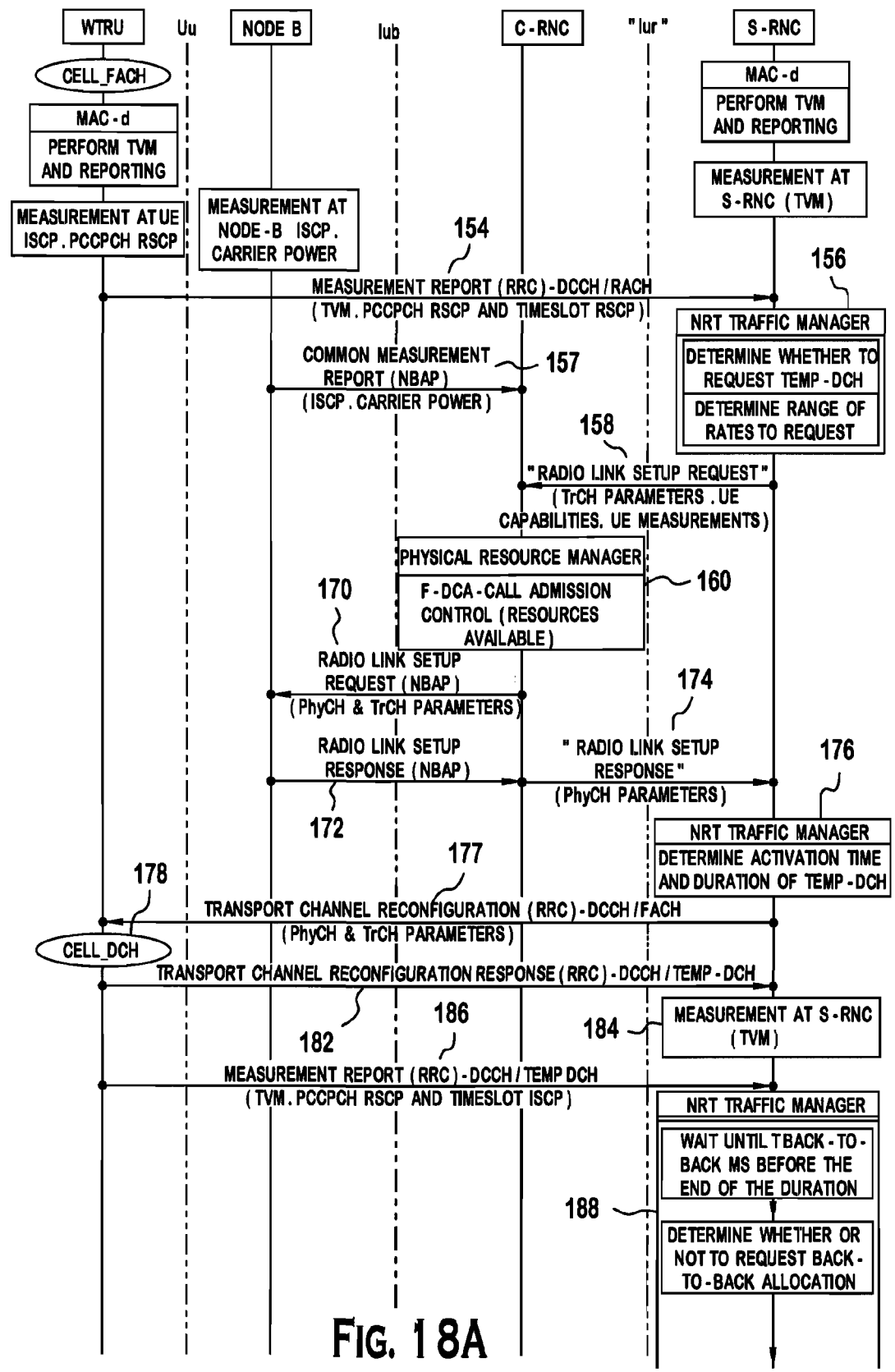
FIGS. 18 (18A and 18B) is a messaging diagram for an unsuccessful allocation of a back-to-back request when resources are not available.
Figure 18B:
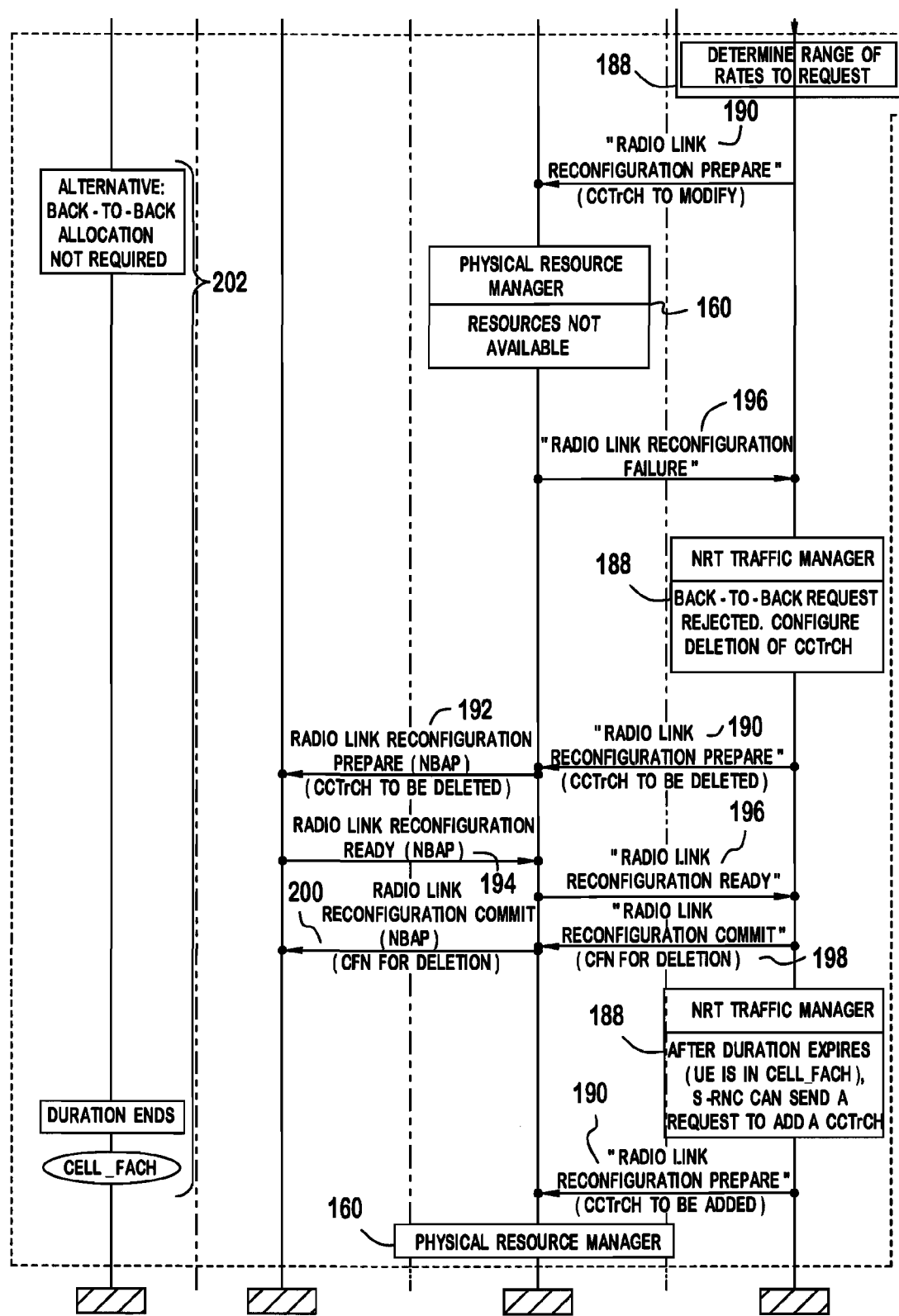
Figure 19A:
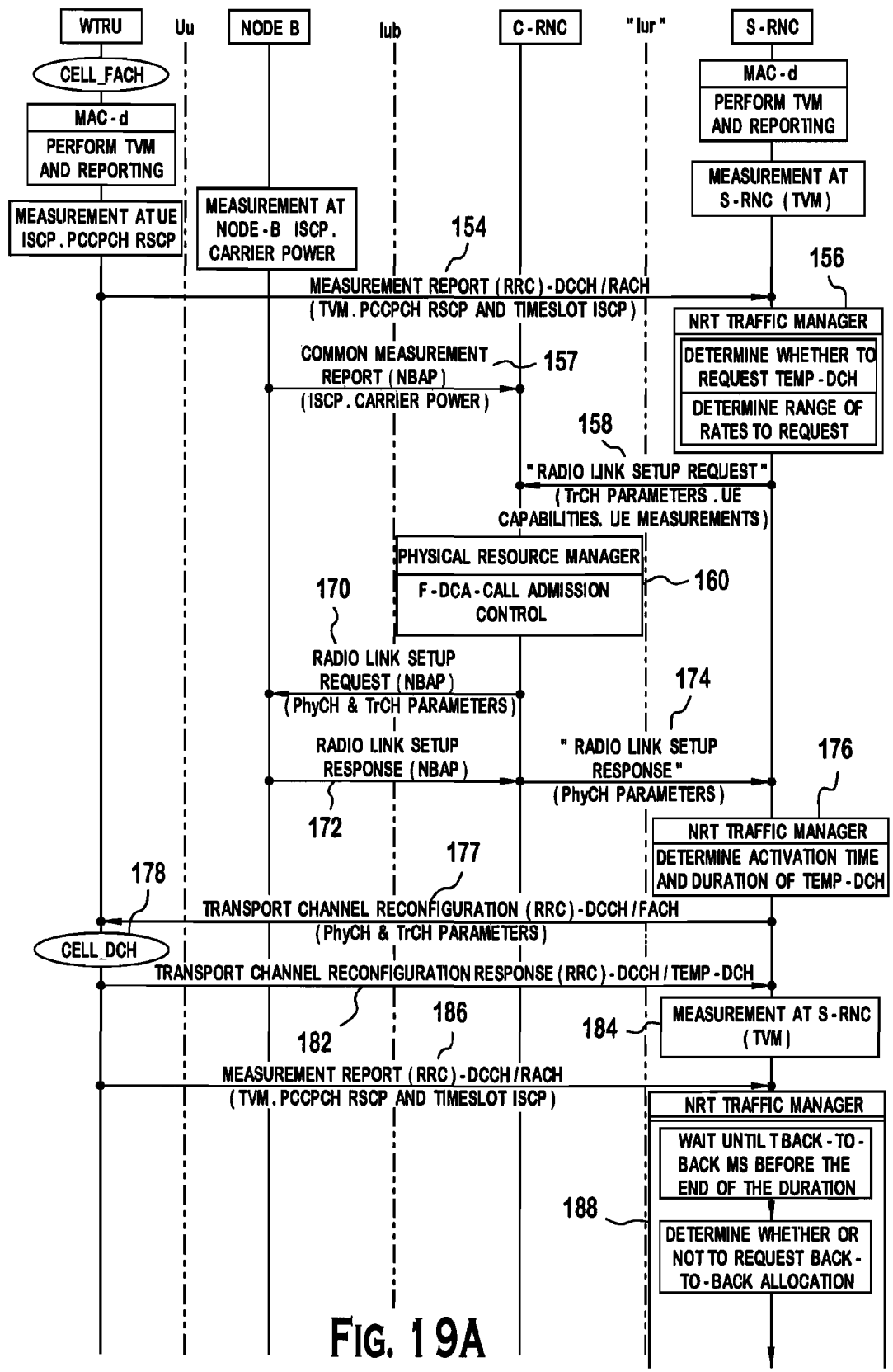
FIGS. 19 (19A and 19B) is a messaging diagram for an unsuccessful allocation of a back-to-back request when the activation time is invalid.
Figure 19B:
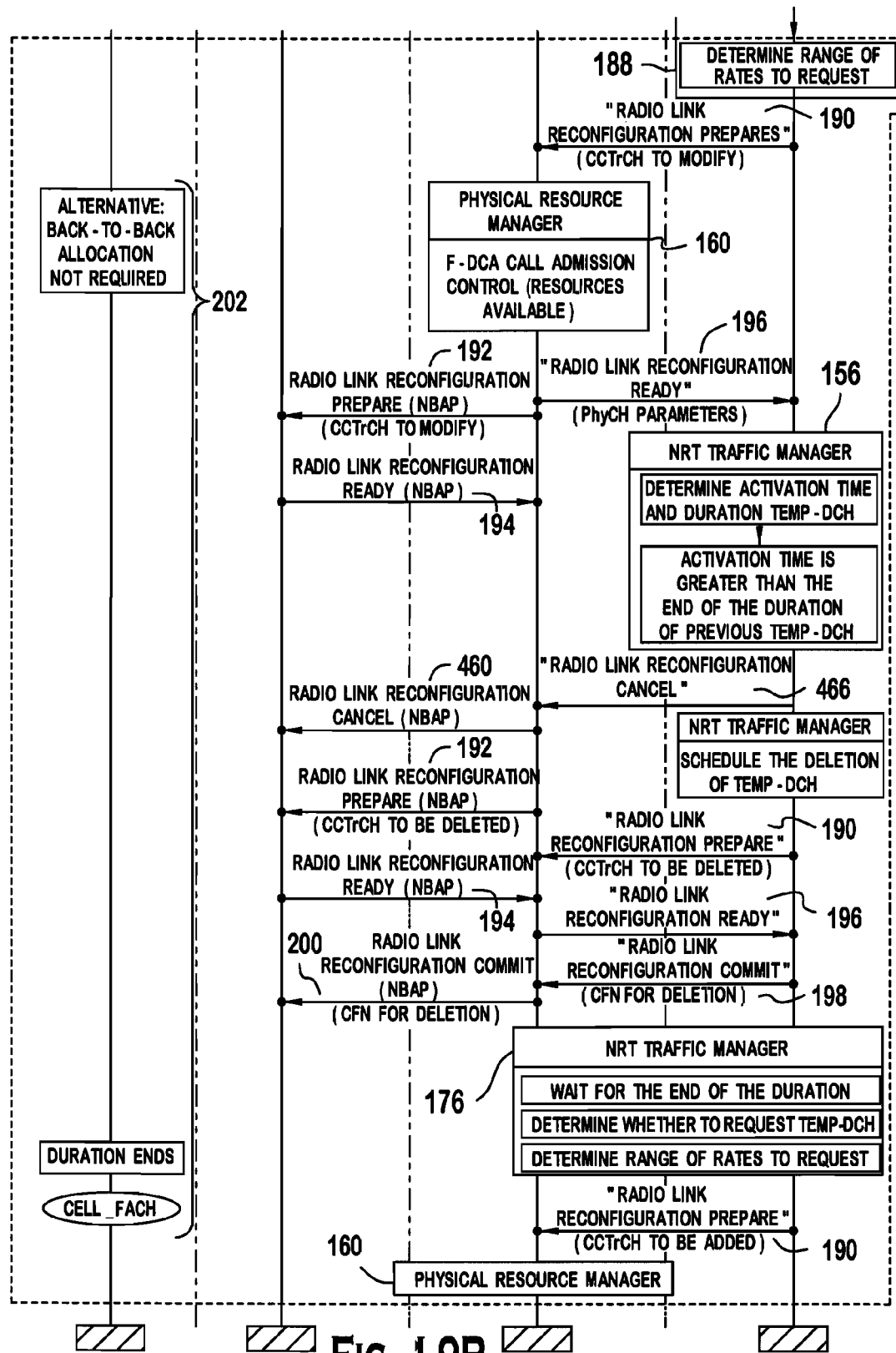

FIG. 17 is a messaging diagram for a successful allocation of a back-to-back request. FIG. 18 is a messaging diagram for a successful back-to-back request for an unsuccessful allocation, when resources are not available. FIG. 19 is a messaging diagram for an unsuccessful back-to-back allocation, when the activation time is invalid. In FIG. 19, a "Radio Link Reconfiguration Cancel" message 466, 468 is sent from the S-RNC 508 to the Node-B 502 via the C-RNC 506.

As described in the previously, the procedures used to support NRT services require close interaction between the C-RNC 506 and S-RNC 508. The interaction between C-RNC 506 and S-RNC 508 are described as follows.

When the NRT-TM in the S-RNC 508 decides to request resources, it sends the request with a subset of allowed TFCs (which represents the range of rates requested) to the C-RNC 506. If the request is for a new allocation, it will include the IE "CCTrCH to add"; if the request is for a back-to-back allocation, it will contain the IE "CCTrCH to modify".

Requests to add a CCTrCH do not have to be supported immediately, they can be queued. The S-RNC 508 will include the IE "allowed queuing time" in the request. The "allowed queuing time" tells the Physical Resource Manager in the C-RNC 506 that, if this request can be filled, then the "activation time" of resource allocation has to be earlier than the time when the allowed queuing time expires. This implies that the request has a validity period, $T_{validity}$, and if the request is not fulfilled before the validity period expires, the C-RNC 506 must send a reject to the S-RNC 508.

Requests to add a CCTrCH do not have to be supported immediately, they can be queued. The S-RNC 508 will include the IE "allowed queuing time" in the request. The "allowed queuing time" tells the Physical Resource Manager in the C-RNC 506 that, if this request can be filled, then the "activation time" of resource allocation has to be earlier than the time when the allowed queuing time expires. This implies that the request has a validity period, $T_{validity}$, and if the request is not fulfilled before the validity period expires, the C-RNC 506 must send a reject to the S-RNC 508.

In order to calculate the validity period, the time to setup physical resources has to be taken into account. It usually takes 100-200 ms to set up physical channel (signaling delay on Iur/Uu); this delay is denoted by $T_{setup}$. Thus, the request validity period is given by $$T_{validity} = \text{AllowedQueuingTime} - T_{setup}$$

The allowed queuing time and $T_{setup}$ are inputs from O&M.

Requests of "CCTrCH to add" that are in the queue will be served when resources become available. Requests that cannot be supported before the validity period expires ($T_{validity}$) will be rejected and a "Radio Link Reconfiguration Failure" (RNSAP) message is sent to the S-RNC 508.

When a request is rejected because $T_{validity}$ expired, the C-RNC 506 does not remove the request from the queue; the request stays in the same position in the queue waiting for the new updated request. Requests can stay in the queue for $T_{stay\_in\_queue}$ ms, where $T_{stay\_in\_queue} > T_{validity}$. That means that a request may be rejected a few times before being finally removed from the queue. For example, if $T_{stay\_in\_queue} = 3 \cdot T_{validity}$, then the request will be rejected 3 times, and only removed from the queue in the third time. $T_{stay\_in\_queue}$ is a design parameter configured by O&M.

As per standards requirements, the S-RNC 508 is not allowed to send another request for the same radio link before the current request is rejected by the C-RNC 506. In this way, a reject from the C-RNC 506 allows the S-RNC 508 to update the measurements and/or data rate requested, at the same time allowing the WTRU 500 to stay in the same position in the queue.

When serving a request of a CCTrCH to add, the Physical Resource Manager determines if there are resources available to support this request. The Physical Resource Manager will check all the rates in the request (in order of the decreasing rate) and verify which rate can be supported. If the PRM finds that even the minimum acceptable rate in the request cannot be supported, the request will be kept in the queue.

When serving a request of a CCTrCH to add, the Physical Resource Manager determines if there are resources available to support this request. The Physical Resource Manager will check all the rates in the request (in order of the decreasing rate) and verify which rate can be supported. If the PRM finds that even the minimum acceptable rate in the request cannot be supported, the request will be kept in the queue.

When assigning resources, in case the WTRU measurements are not available, the PRM in the C-RNC 506 will assign a low-rate channel that will be used by the WTRU 500 to report measurements. When a low-rate is assigned, the request is not removed from the queue; the request stays in the same position in the queue (for at most $T_{stay\_in\_queue}$ ms), waiting for a new update request (new request with measurements). The request is then served when the new request (with measurements) arrives. If the new request still does not have measurements, another low-rate channel is assigned.

When assigning resources, in case the WTRU measurements are not available, the PRM in the C-RNC 506 will assign a low-rate channel that will be used by the WTRU 500 to report measurements. When a low-rate is assigned, the request is not removed from the queue; the request stays in the same position in the queue (for at most $T_{stay\_in\_queue}$ ms), waiting for a new update request (new request with measurements). The request is then served when the new request (with measurements) arrives. If the new request still does not have measurements, another low-rate channel is assigned.

After resources are allocated, the C-RNC 506 sends the response to the S-RNC 508. The S-RNC 508 then calculates the activation time and duration of the Temp-DCH. The activation time should be as soon as possible (S-RNC 508 must take into account delays through the system in order to determine what "as soon as possible" is). The S-RNC 508 configures the C-RNC 506 with the activation time ("Radio Link Reconfiguration Commit" message).

At every Temp-DCH allocation, $T_{back-to-back}$ ms before the end of the duration, the NRT-TM in the S-RNC 508 decides if a back-to-back allocation is needed. If so, it sends a request with a "CCTrCH to modify" to the C-RNC 506. If not, the S-RNC 508 must configure the deletion of the CCTrCH in the C-RNC 506 by including the IE "CCTrCH to delete". $T_{back-to-back}$ is a design parameter configured by O&M.

Requests to modify a CCTrCH are requests for back-to-back allocations and cannot be queued, they must be either served immediately or rejected. In this case, the "allowed queuing time" IE, which is an optional parameter in the "Radio Link Reconfiguration Prepare" (RNSAP) message, is absent. In this case $T_{validity}=0$.

When receiving a request for a back-to-back allocation (IE "CCTrCH to modify"), the PRM checks if there are any resources available and, if so, it processes the request. If the data rate requested (TFCS requested) is the same as the data rate already assigned to that CCTrCH, the same resources can be kept for the user. Because F-DCA-Escape and Background are not run for NRT services, the PRM first verifies if the measurements (interference and Node-B power) are acceptable in all of the allocated resources. This verification is the same as the one done for F-DCA Escape.

DL interference measured by a WTRU 500 is high (DL Timeslot ISCP)

UL interference measured by Node-B 502 is high (UL Timeslot ISCP)

Node-B 502 reached the maximum allowed transmit power (Transmitted Carrier Power)

The threshold values are determined by O&M. The values can be different than the ones used in F-DCA-Escape. If at least one of the conditions above was true in the last measurement report (from the WTRU 500 or Node-B 502), then the current allocation is considered not to be appropriate and the PRM will call the F-DCA-Call Admission Control function in order to determine new resource allocation. Similarly, if the data rate requested (TFCS) is not the same as the currently allocated, PRM call F-DCA-Call Admission Control.

When running F-DCA-Call Admission Control for back-to-back allocations, the physical resources currently assigned to that CCTrCH are considered to be free in the algorithm. This is because the C-RNC 506 "knows" that this is a back-to-back allocation, and the activation time will be the end of the duration of the previously allocated Temp-DCH, and therefore the currently allocated resources will be released by the WTRU 500.

If resources are available, the C-RNC 506 sends the response to the S-RNC 508 ("Radio Link Reconfiguration Ready" message). The S-RNC 508 then calculates the activation time and duration of the Temp-DCH. In case of back-to-back, the activation time should be the CFN at the end of the duration of the previously allocated Temp-DCH. The S-RNC 508 configures the C-RNC 506 with the activation time ("Radio Link Reconfiguration Commit" message).

If the response from the C-RNC 506 arrives too late to perform a back-to-back (the activation time is greater than the end of the duration of the previously allocated Temp-DCH), the S-RNC 508 must cancel the reconfiguration request ("Radio Link Reconfiguration Cancel" message). After the reconfiguration is cancelled, the S-RNC 508 will configure the C-RNC 506 to delete the CCTrCH at the end of the duration (since the C-RNC 506 does not know the duration of the Temp-DCH). The S-RNC 508 will then send a new updated request with "CCTrCH to add" after the end of the duration of the previously allocated Temp-DCH.

If resources are not available, the C-RNC 506 sends a reject to the S-RNC 508 ("Radio Link Reconfiguration Failure" message). After receiving the reject, the S-RNC 508 has to configure the deletion of the CCTrCH (since the C-RNC 506 does not know the "duration" of the Temp-DCH). After the Temp-DCH duration is over, the S-RNC 508 can send a new request with updated measurements and updated data rate to request (updated TFCS).

Table 2 is a list of parameter input into the NRT traffic manager.

TABLE 2

| Parameters | Units | Source |
| --- | --- | --- |
| Full TFCS for the CCTrCH | | Transport Format Manager |
| TVM | bits | UE and S-RNC MAC |
| Maximum duration of Temp-DCH, $T_{max}$ | ms | O&M initialization function |
| Minimum duration of Temp-DCH, $T_{min}$ | ms | O&M initialization function suggested value is 1000 ms |
| Margin for calculation of maximum rate to request, $M_{Rn}$ | ms | O&M initialization function |
| Duration of low-rate Temp-DCH, $T_{sr}$ | ms | O&M initialization function suggested value is 1000 ms |
| Time it takes to setup a physical channel in the UTRAN side (send a request for physical resources to the C-RNC, process request, configure Node-B, and send the response), $UTRAN_{setup}$ | ms | O&M initialization function suggested value is 200 ms |
| Time (before Temp-DCH duration expires) when S-RNC must decide whether or not to perform back-to-back, $T_{back-to-back}$ | ms | O&M initialization function |

TABLE 2-continued

| Parameters | Units | Source |
|---|---|---|
| Allowed queuing time | sec | O&M initialization function |
| Minimum allowed rate, $R_{st}$ | bps | O&M initialization function |

Table 3 is a list of parameter for the physical resource manager for NRT services.

TABLE 3

| Parameters | Units | Source |
|---|---|---|
| Time that the request can stay in the queue, $T_{stay\_in\_queue}$ | sec | O&M initialization function suggested value is 6 seconds |
| Time it takes to setup a physical channel in the UE (time is takes to send the message from S-RNC to the UE plus the internal delay in the UE to configure lower layers), $T_{setup}$ | ms | O&M initialization function suggested value is 200 ms |
| allowed queuing time | ms | "RL Setup Request" message from S-RNC |
| UL and DL Timeslot ISCP thresholds for back-to-back allocations | | O&M initialization function |
| Rate of triggering algorithm to update request validity, $T_{rate}$ | ms | design decision |

Figure 20:
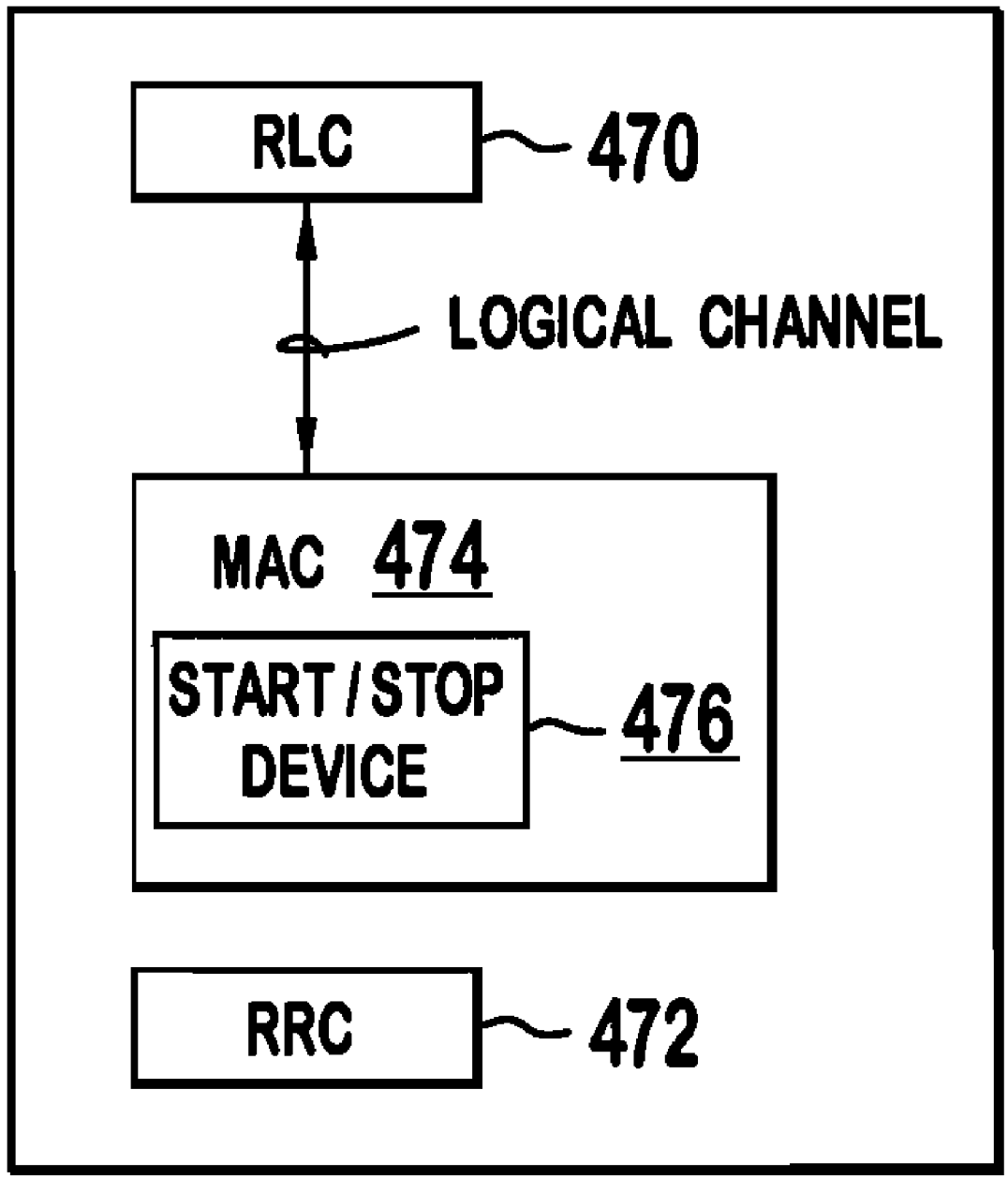
FIG. 20 is a simplified diagram of a WTRU or RNC with a start/stop function.

FIG. 20 is a simplified diagram of a WTRU 500 or RNC 504 having a MAC 474 with a start/stop device 476. The MAC Layer 474 in the WTRU 500 and in the RNC 504, such as in the third generation partnership project (3GPP) UMTS system, is responsible for scheduling of data transmission in the uplink and downlink, respectively. A logical channel is used for communication between the RLC 470 and the MAC layers 476. The RLC 470 measures its buffer occupancy and reports these measurements to the MAC 474, allowing the MAC 474 to pre-determine multiplexing and scheduling choices. When requested by the MAC 474, the RLC 470 builds and delivers PDUs (Protocol Data Units) to the MAC 474, using the logical channel.

The RRC layer 470 in the RNC 504 is responsible for configuration of resources for every cell controlled by that RNC 504 and for every user in a cell controlled by the RNC 504. This involves configuration of lower layers in RNC 504, of Node-B 502 (via NBAP signaling over the Iub) and of WTRU 500 (via RRC signaling over the air). When the WTRU RRC 472 receives configuration from the RNC RRC 472, the WTRU RRC 472 is responsible for configuration of lower layers in the WTRU 500.

When a configuration or reconfiguration procedure is invoked, the new configuration must take effect at the activation time determined by the RNC RRC 504. If an activation time is not defined by the RNC RRC 472, then the configuration must take effect immediately.

When designing the WTRU 500 and RRC 472, this rule is taken into account. For example when the WTRU 500 is told to perform handover at a certain CFN, the WTRU 500 must be ready to transmit and receive data at that given CFN. However, that does not mean that the WTRU 500 has to start transmitting data at the specific CFN. According to standards rules, if data is not provided by the higher layers to the physical layer, the physical layer will send "special bursts", which are dummy data just to keep the link alive.

During a reconfiguration, even a synchronized reconfiguration, there is a period of time where the channel is unstable. Because of that, there are situations where it may be desirable that the RRC 472 configures the lower layer to stop the data transmission over the air, in which case the physical layer will send the special bursts instead. This guarantees that actual data is not lost.

This feature is currently available in the RLC layer 470 of the 3GPP UMTS system. This is a stop/continue function which works as follows. When an RLC entity 470 is "stopped" by the RRC 472, the RLC 470 entity will stop submitting any RLC PDUs to lower layer or receiving any RLC PDUs. When a RLC entity 470 is "continued" by upper layers, the RLC entity 470 will continue the data transmission and reception.

The stop/continue function is unsynchronized; when the RLC 470 is told to stop, it will stop immediately. Because the RLC 470 is not aware of frame numbers (CFN or SFN), the RRC 472 is not able to stop the transmission at any specific frame number.

A start/stop function, such as performed by a start/stop device 476, in the MAC layer 474 allows the RRC 472 in the WTRU 500 and RNC 504 to request the MAC 474 to start or stop requesting data for a specific logical channel in a specific radio frame. When the MAC 474 is told to stop the transmission of a logical channel in a specific radio frame, that channel becomes "inactive" at that radio frame. When the MAC 474 is told to start the transmission of a logical channel in a specific radio frame, that channel becomes "active" at that radio frame. When performing TFC Selection (which is the procedure used by the MAC 474 for scheduling of data transmission), the MAC 474 will not take into account the buffer occupancy of the inactive logical channels.

The MAC 474 considers every channel to be active when first configured, and the channel would remain active as long as there is no stop command for that channel. When a stop command is received, the channel becomes inactive in the specified radio frame. This would be similar to the stop/continue function of the RLC layer 470. Another option is to consider every channel to be inactive when first configured, and the channel would remain inactive as long as there is no start command for that channel. The MAC 474 would only start using that channel in the TFC selection in the frame specified in a start command.

The start/stop MAC feature can potentially be implemented independently by WTRU 500 and RNC manufactures. This function can be implemented via a primitive in between RRC 472 and MAC 476, which would identify the logical channel, the frame number (CFN) and whether to start or stop the transmission of that given logical channel at the specified CFN.

This function can also work for cases where unsynchronized start/stop is desired. In that case, the radio frame specified should be given as "now", which means the start/stop command should take effect immediately.

When a procedure is used to perform a modification in the channel configuration, the start/stop MAC feature may be used by both WTRU 500 and RNC 504 independently. The criteria of when the MAC 474 should stop and start requesting data from the RLC layer 470 (to send to the Physical Layer) can be a function as follows.

If it is WTRU or RNC side

The procedure being used (Establishment, Handover, Reconfiguration, Release, etc)

The type of procedure being used (synchronized or unsynchronized)

The type of logical channel (DTCH or DCCH)

For traffic channel (DTCH), the type of service (CS or PS)

To illustrate the applicability of the start/stop function, an example of a handover procedure using it follows. Handover procedures may involve circuit switched (CS) or packet switched (PS) domain services, or both. During handover of a CS domain service (e.g., voice call), data duplication/combining can be used in the RNC side and since this is a delay sensitive application, data transmission should not stop. Packets may be dropped, but this is preferable over delaying the transmission.

Handover of a PS domain service (e.g., web application), data transmission can be delayed until the user is synchronized in the new cell. If the handover is done via a synchronized procedure, the data can be stopped for a fixed number of frames, starting at the activation time.

Handover of PS and CS domain can use different rules for each service, since they are mapped to different logical channels. The CS domain traffic should not be delayed, but the PS domain traffic can be delayed until the user is synchronized in the new cell.

The number of frames for which the WTRU 500 and RNC 504 stop transmission of each logical channel may be a function of several factors. For example, in the WTRU side, the WTRU manufacturer knows how long it takes (approximately) for the WTRU 500 to synchronize in a new cell. This depends, for example, if this is an inter-frequency or intra-frequency handover. So the start/stop function can be designed accordingly. In the RNC side, the operator may want to wait until it receives the response from the WTRU 500 indicating the successful handover before start transmitting.

The usage of start/stop function also applies to the signaling channel. The signaling channel may follow the same rules as the PS domain service (since it is not delay sensitive as CS domain service). However, when appropriate, different rules can apply to traffic and signaling channel. Even if two logical channels are mapped into the same transport channel, different rules can apply for each logical channel of the given transport channel.

What is claimed is:

1. A wireless transmit/receive unit (WTRU) comprising:
   a radio link controller configured to establish a first dedicated channel having a predetermined duration and to disestablish the first dedicated channel at the end of the predetermined duration, the radio link controller further configured to establish a second dedicated channel at the end of the uredetermined duration; and
   a receiver configured to receive packet data over the established first and second dedicated channels for the predetermined duration.

2. The WTRU of claim 1 wherein the first and second dedicated channels include a predetermined transmission data rate based on a perceived overhead and an amount of collected packet data.

3. The WTRU of claim 1 wherein the established second dedicated channel has a same transport format combination as the first established dedicated channel.

4. The WTRU of claim 1 wherein the established second dedicated channel has a different transport format combination than the first established dedicated channel.

5. A wireless transmit/receive unit (WTRU) comprising:
   a medium access controller (MAC) configured to schedule data transmissions;
   a radio link controller configured to send the MAC protocol data units (PDUs) for data transmission over a specified logical channel; and
   a start/stop device configured to start or stop a request for PDUs by the MAC over the specified logical channel in a particular radio frame, wherein the start/stop device is a primitive effectively coupled between a radio resource controller and the MAC.

6. The WTRU of claim 5 wherein on condition that the specified logical channel is started, the specified logical channel is active and when the specified logical channel is stopped, the specified logical channel is inactive.

7. The WTRU of claim 6 wherein on condition that the MAC selects a transmit format combination selection, the MAC considers a buffer occupancy excluding data for inactive channels.

8. A wireless transmit/receive unit (WTRU) comprising:
   a radio link controller configured to establish a first dedicated channel having a predetermined duration and to disestablish the first dedicated channel at the end of the predetermined duration, the radio link controller further configured to establish a second dedicated channel at the end of the predetermined duration, wherein the established second dedicated channel has a same transport format combination as the first established dedicated channel; and a receiver configured to receive packet data over the established first and second dedicated channels for the predetermined duration.

9. A wireless transmit/receive unit (WTRU) comprising:
a radio link controller configured to establish a first dedicated channel having a predetermined duration and to disestablish the first dedicated channel at the end of the predetermined duration, the radio link controller further configured to establish a second dedicated channel at the end of the predetermined duration, wherein the established second dedicated channel has a different transport format combination than the first established dedicated channel; and
a receiver configured to receive packet data over the established first and second dedicated channels for the predetermined duration.

10. A wireless transmit/receive unit (WTRU) comprising:
a medium access controller (MAC) configured to schedule data transmissions, wherein on condition that the MAC selects a transmit format combination selection, the MAC considers a buffer occupancy excluding data for inactive channels;
a radio link controller configured to send the MAC protocol data units (PDUs) for data transmission over a specified logical channel, wherein on condition that the specified logical channel is started, the specified logical channel is active and on condition that the specified logical channel is stopped, the specified logical channel is inactive; and
a start/stop device configured to start or stop a request for PDUs by the MAC over the specified logical channel in a particular radio frame.

* * * * *